(12) United States Patent
Huang et al.

(10) Patent No.: US 7,142,697 B2
(45) Date of Patent: *Nov. 28, 2006

(54) POSE-INVARIANT FACE RECOGNITION SYSTEM AND PROCESS

(75) Inventors: Fu Jie Huang, Plainsboro, NJ (US); Hong-Jiang Zhang, Beijing (CN); Tsuhan Chen, Pittsburg, PA (US)

(73) Assignee: Microsoft Corporation, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/982,743

(22) Filed: Nov. 5, 2004

(65) Prior Publication Data

US 2005/0147291 A1 Jul. 7, 2005

Related U.S. Application Data

(63) Continuation of application No. 09/536,820, filed on Mar. 27, 2000, now Pat. No. 6,944,319.

(51) Int. Cl.
G06K 9/00 (2006.01)
G06K 9/62 (2006.01)

(52) U.S. Cl. ............... 382/118; 382/159; 340/5.52; 340/5.53; 902/3; 713/186

(58) Field of Classification Search ............... 382/118, 382/155, 156, 159, 170, 181, 203; 340/5.52, 340/5.53; 902/3; 713/186
See application file for complete search history.

(56) References Cited

U.S. PATENT DOCUMENTS 5,164,992 A * 11/1992 Turk et al. ............... 382/118
6,128,397 A * 10/2000 Baluja et al. ............... 382/118

OTHER PUBLICATIONS

Rowley et al. "Rotation Invariant Neural Network-Based Face Detection", Dec. 1997, pp. 1-13.*

* cited by examiner

*Primary Examiner*—Jingge Wu
*Assistant Examiner*—Aaron Carter
(74) *Attorney, Agent, or Firm*—Lyon & Harr, LLP; Richard T. Lyon

(57) ABSTRACT

A face recognition system and process for identifying a person depicted in an input image and their face pose. This system and process entails locating and extracting face regions belonging to known people from a set of model images, and determining the face pose for each of the face regions extracted. All the extracted face regions are preprocessed by normalizing, cropping, categorizing and finally abstracting them. More specifically, the images are normalized and cropped to show only a persons face, categorized according to the face pose of the depicted person's face by assigning them to one of a series of face pose ranges, and abstracted preferably via an eigenface approach. The preprocessed face images are preferably used to train a neural network ensemble having a first stage made up of a bank of face recognition neural networks each of which is dedicated to a particular pose range, and a second stage constituting a single fusing neural network that is used to combine the outputs from each of the first stage neural networks. Once trained, the input of a face region which has been extracted from an input image and preprocessed (i.e., normalized, cropped and abstracted) will cause just one of the output units of the fusing portion of the neural network ensemble to become active. The active output unit indicates either the identify of the person whose face was extracted from the input image and the associated face pose, or that the identity of the person is unknown to the system.

5 Claims, 17 Drawing Sheets

(a) OUTPUTS OF FEEDING A'S ANGLE' *a* IMAGE (b) OUTPUTS OF FEEDING REJECTION'S ANGLE' *b* IMAGE (a) COMBINING THE RESULTS OF CLASSIFIERS (b) COMBINING THE RESULTS OF REGRESSION ESTIMATORS (a) PERSON A'S ANGLE' *a* IMAGE FED (b) PERSON A'S ANGLE' *b* IMAGE FED (c) PERSON B'S ANGLE *a* IMAGE FED (d) PERSON B'S ANGLE' *b* IMAGE FED

POSE-INVARIANT FACE RECOGNITION SYSTEM AND PROCESS

CROSS-REFERENCE TO RELATED APPLICATIONS

This application is a continuation of a prior application entitled "POSE-INVARIANT FACE RECOGNITION SYSTEM AND PROCESS" which was assigned Ser. No. 09/536,820 and filed Mar. 27, 2000 now U.S. Pat. No. 6,944,319.

BACKGROUND

1. Technical Field

The invention is related to face recognition systems for identifying people depicted in an input image, and more particularly to such a face recognition system and process that also identifies the face pose of each identified person.

2. Background Art

The problem of recognizing people depicted in an image from the appearance of their face has been studied for many years. Face recognition systems and processes essentially operate by comparing some type of model image of a person's face (or representation thereof) to an image or representation of the person's face extracted from an input image. In the past, most of these systems required that both the original model image and the input image be essentially frontal views of the person. This is limiting in that to obtain the input images containing the a frontal view of the face of the person being identified, that person had to either be purposefully positioned in front of a camera, or a frontal view had to be found and extracted from a non-staged input image (assuming such a frontal view exist in the image).

More recently there have been attempts to build a face recognition system that works with faces rotated out of plane. For example, one approach for recognizing faces under varying poses is the Active Appearance Model proposed by Cootes et al. [3], which deforms a generic 3-D face model to fit the input image and uses the control parameters as a feature fed to a classifier. Another approach is based on transforming an input image into stored prototypical faces and then using direct template matching to recognize the person whose face is depicted in the input image. This method is explored in the papers by Beymer [4], Poggio [5] and Vetter [6].

Essentially, all the current face recognition approaches can be classified into two categories: model based and appearance based [1]. The model based approach tries to extract geometrical measurements of certain facial parts, while the appearance based approach usually employs eigenfaces [2] to decompose images and then uses decomposition coefficients as the input to a classifier.

The present pose-adaptive face recognition system and process represents an extension of the appearance based approaches and has the capability to recognizing faces under varying poses.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [13, 14]. A listing of the publications corresponding to each designator can be found at the end of the Detailed Description section.

SUMMARY

The present invention is directed toward a face recognition system and process that overcomes the aforementioned limitation in prior face recognition systems by making it possible to recognize a person's face from input images containing either frontal or non-frontal views of the person's face. Thus, a non-staged image, such as a frame from a video camera monitoring a scene, can be processed via conventional means to extract a region depicting the face of a person it is desired to identify, without regard to whether the person is directly facing at the camera. Essentially, as long as the person's face is visible in the extracted region, the present face recognition system can be used to identify the person. In addition, the present invention can be used to not only recognize persons from images of their face, but also provide pose information. This pose information can be quite useful. For example, knowing which way a person is facing can be useful in user interface and interactive applications where a system would respond differently depending on where a person is looking. Having pose information can also be useful in making more accurate 3D reconstructions from images of the scene. For instance, knowing that a person is facing another person can indicate the first person is talking to the second person. This is useful in such applications as virtual meeting reconstructions.

Because the present face recognition system and associated process can be used to recognize both frontal and non-frontal views of a person's face, it is termed a pose-invariant face recognition system. For convenience in describing the system and process, the term "pose" or "face pose" will refer to the particular pitch, roll and yaw angles that describe the position of a person's head (where the 0 degree pitch, roll and yaw position corresponds to a person facing the camera with their face centered about the camera's optical axis).

The pose-invariant face recognition system and process generally involves first locating and segmenting (i.e., extracting) a face region belonging to a known person in a set of model images. The face pose data is also determined for each of the face regions extracted from the model images. This process is then repeated for each person it is desired to model in the face recognition system. The model images can be captured in a variety of ways. One preferred method would involve positioning a subject in front of a video camera and capturing images (i.e., video frames) as the subject moves his or her head in a prescribed manner. This prescribed manner would ensure that multiple images of all the different face pose positions it is desired to identify with the present system are obtained.

All extracted face regions from the model images are preprocessed to prepare them for eventual comparison to similarly prepared face regions extracted from input images. In general, this will involve normalizing, cropping, categorizing and finally abstracting the extracted image regions so as to facilitate the comparison process. The normalizing and cropping procedure preferably entails resizing each extracted face region to the same prescribed scale, as necessary, and adjusting each region so that the eye locations of the depicted subject fall within the same prescribed area in the image region. The extracted face regions are then cropped to eliminated unneeded portions not specifically depicting part of the face of the subject. The categorization procedure simply entails defining a series of pose range groups and identifying which group the pose of the face depicted in each of the normalized and cropped face images falls. As for the abstracting procedure, this is essentially a method of representing the images in a simpler form to reduce the processing necessary in the aforementioned comparison. Any appropriate abstraction process could be employed for this purpose (e.g., histograming, Hausdorff distance, geometric hashing, active blobs, and others), although the preferred method entails the use of eigenface representations and the creation of PCA coefficient vectors to represent each normalized and cropped face image. Specifically, this eigenface approach entails first assigning a prescribed number of the normalized and cropped face images associated with each person being modeled to a selected pose range group. Each of these assigned face images is then concatenated to create respective dimensional column vectors (DCV's) preferably consisting of the pixel intensity values of the pixels making up the associated face image. A covariance matrix is computed using all the DCV's associated with the selected pose range group, and then eigenvectors and associated eigenvalues are computed from the covariance matrix. The eigenvalues are ordered in descending order and a first prescribed number of them are identified. The eigenvectors associated with the identified eigenvalues are then used to form the rows of a basis vector matrix (BVM) associated with the selected pose range group. The foregoing eigenface abstracting procedure is then repeated for each of the remaining pose range groups to generate BVMs for each of these groups as well. Finally, each DCV is multiplied by each BVM to produce a set of PCA coefficient vectors for each face image.

In one preferred embodiment of the pose-invariant face recognition system, a portion of the prepared face image representations are next used to train a bank of "face recognition" neural networks. These face recognition neural networks constitute a first stage of a neural network ensemble that includes a second stage in the form of a single "fusing" neural network that is used to combine or fuse the outputs from each of the first stage neural networks. The prepared face image representations are also used to train the fusing neural network. Once this is accomplished, the system is ready to accept prepared input face images for identification purposes. To this end, the next part of the process involves locating and segmenting one or more face regions from an input image. Each extracted face region associated with a person that it is desired to identify is then prepared in a way similar to the regions extracted from the model images and input into the neural network ensemble one at a time. Finally, the output of the neural network ensemble is interpreted to identify the person and the pose data associated with each input.

The preferred architecture of the proposed neural network ensemble has two stages as indicated previously. The first stage is made up of a plurality of "face recognition" neural networks. Other face recognizers, each is designed to recognize faces of a give pose, can also be used at this first stage. Each of these face recognition neural networks is dedicated to a particular pose range group. The number of input units or nodes of each face recognition neural network equals the number of elements making up each PCA coefficient vector.

This is because the PCA coefficient vector elements are input into respective ones of these input units. The number of output units or nodes of each face recognition neural network equals the number of persons it is desired to recognize, plus preferably one additional node corresponding to an unknown identity state. It is also noted that the output from each output unit is a real-value output. Thus, the competition sub-layer typically used in an output layer of a neural network to provide a "winner takes all" binary output is not employed.

The output units of each of the face recognition neural networks are connected in the usual manner with the input units of the single "fusing" neural network forming the second stage of the neural network ensemble. The number of input units of the fusing neural network is equal to the number of first stage face recognition neural networks multiplied by the number of output units in each of the first stage neural networks. In addition, the number of output units of the fusing neural network equals the number of input units. Since the number of output units associated with each of the face recognition neural networks is equal to the number of persons it is desired to identify with the face recognition system (plus one for all unidentified persons), there will be enough fusing network output units to allow each output to represent a separate person at a particular one of the pose range groups. Thus, it is advantageous for the output layer of the fusing neural network to include the aforementioned competition sub-layer so that only one output node is active in response to the input of a PCA coefficient vector into the first stage face recognition neural networks. In this way a single output node will be made active, and the person and pose associated with this active node can be readily determined.

The use of a fusing neural network has several advantages. First, the fusing network makes it possible to determine both identity and pose information from a single binary output from the network. This would not be possible using just the face recognition neural networks of the first stage. In addition, it has been found that none of the first stage face recognition neural networks is particularly accurate, however, once the outputs of these networks are fed through the fusing network, the recognition accuracy increases dramatically.

As indicated previously, to employ the neural network ensemble, the individual neural networks making it up must be trained. The face recognition neural networks of the first stage of the ensemble are trained by inputting, one at a time, each of the PCA coefficient vectors associated with the pose range group of a selected face recognition neural network into the inputs of that neural network. In other words, the PCA vectors, which were generated by multiplying a DCV by the BVM associated with the pose range group of the selected face recognition neural network, are input into the inputs of the neural network. Each of the PCA vectors used in the training process represents a known face in a particular one of the pose range groups. This is repeated until the outputs of the selected face recognition neural network stabilize. The same procedure is employed to train all the remaining face recognition neural networks using the PCA vectors specific to their respective pose range groups.

Once all the face recognition neural networks have been trained, the fusing neural network is initialized for training. This time, the PCA coefficient vectors generated from a particular DCV are simultaneously input into the respective face recognition neural network associated the vector's particular pose range group. This is repeated for each set of PCA coefficient vectors generated from each of the remaining DCVs to complete one training cycle. As before, the training cycle is repeated until the outputs of the fusing neural network stabilize. Finally, the aforementioned set of PCA coefficient vectors generated from each DCV are input one set at a time into the respective face recognition neural network associated each vector's particular pose range group, and the active output of the fusing neural network is assigned as corresponding to the particular person and pose associated with the model image used to create the set of PCA coefficient vectors.

The neural network ensemble is then ready to accept face image inputs associated with un-identified persons and poses, and to indicate who the person is and what pose is associated with the input face image. It should be remembered however that one of the important features of the pose-invariant face recognition system and process is that a person can be recognized regardless of their face pose— something heretofore not possible with existing recognition systems. Thus, the present invention can be advantageously employed even when the face pose of a person is not of interest, and it is only desired to identify a person depicted in an input image. In such a case the pose information that the system is capable of providing can simply be ignored. It is noted that if the person associated with the inputted face image is not one of the modeled persons, the network ensemble will indicate that the person is unknown. To input the image of an un-identified person, the face region is extracted from the input image and the region is preprocessed to create a set of PCA coefficient vectors representing the extracted face image. Specifically, each PCA coefficient vector set is generated by respectively multiplying a DCV created from the extracted face region by each BVM associated with the pose range groups. Each vector in the set of PCA coefficient vectors is then input into the respective face recognition neural network associated that vector's particular pose range group. For each set of PCA coefficient vectors input the ensemble, an output is produced from the fusing neural network having one active node. The person and pose previously assigned to this node is then designated as the person and pose of the input image face region associated with the inputted PCA coefficient vector. If, however, the node previously assigned as representing an unknown person is activated, the input face image is deemed to belong to a person of unknown identity and unknown pose.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
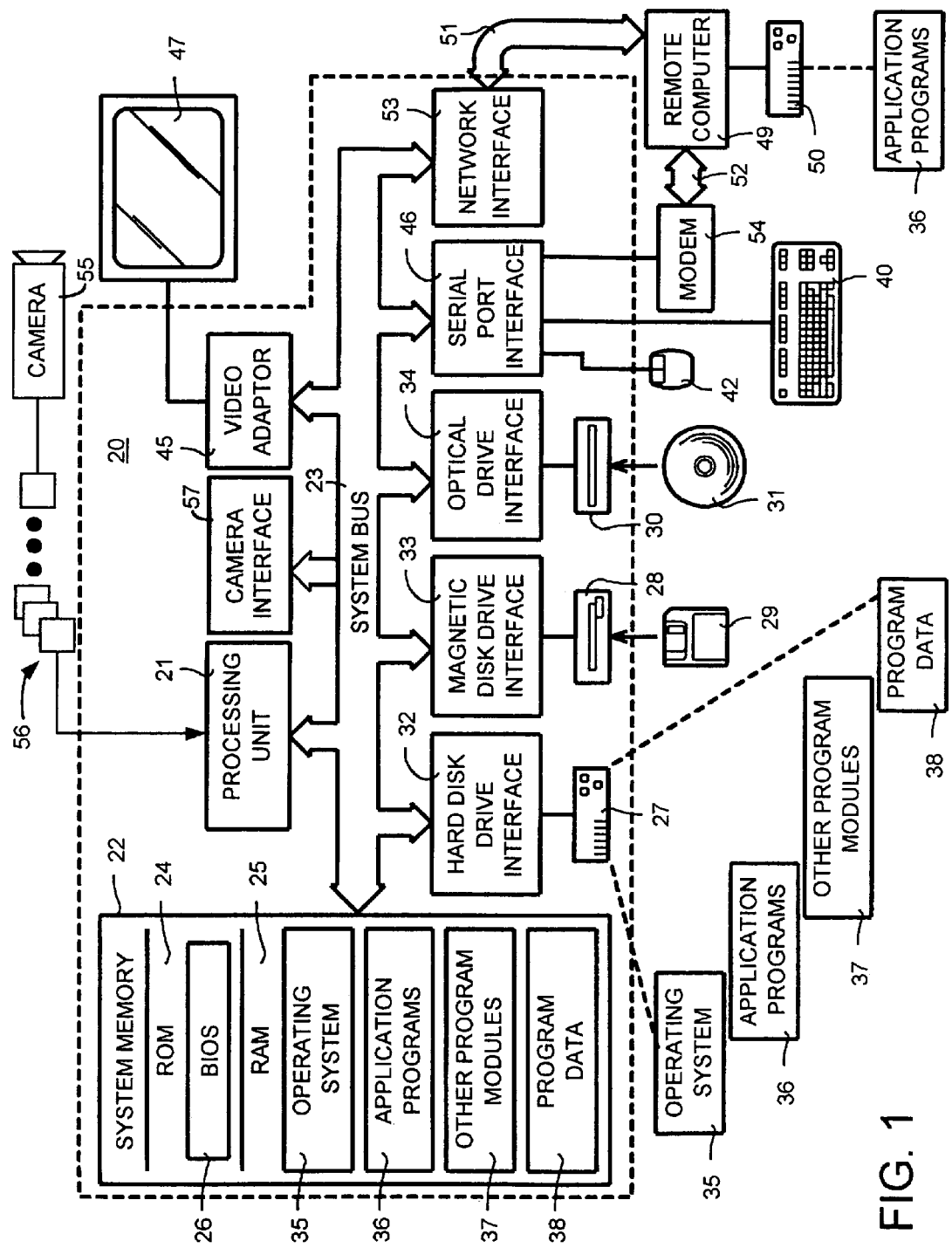
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1 The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining parts of this description section will be devoted to a description of the program modules embodying the invention. First, the pose-invariant system and process will be described generally in section 1.0 et seq., and then in section 2.0 et seq., a tested embodiment will be discussed. Finally, in section 3.0 et seq., several tests and their test results are described in which the tested embodiment, or a variation thereof, was employed.

1.0 Pose-Invariant Face Recognition System and Process.

Figure 2:
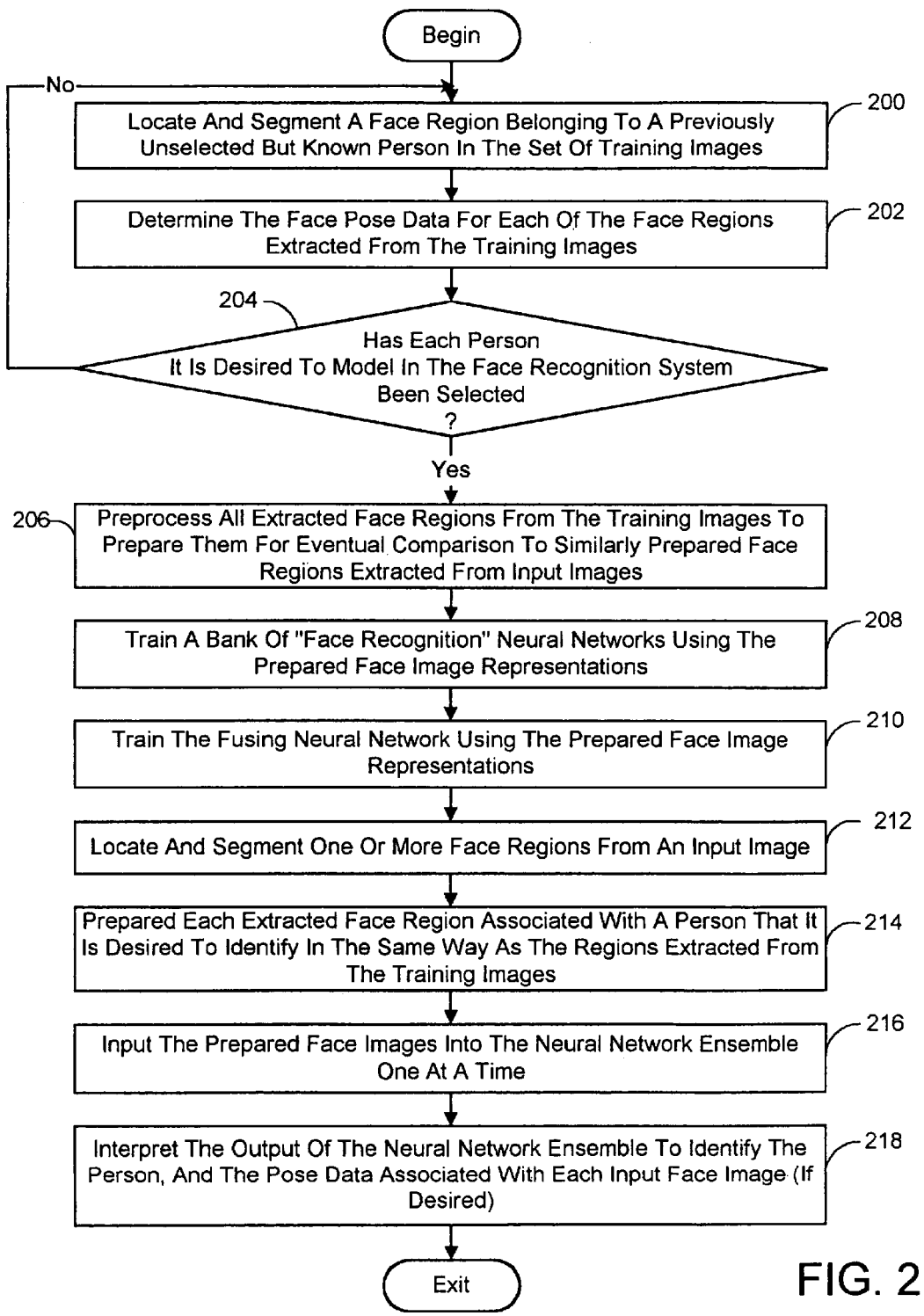
FIG. 2 is a flow chart diagramming an overall face recognition process for identifying a person depicted in an input image and the face pose of each identified person.

Generally, the pose-invariant face recognition process according to the present invention is accomplished via the following process actions, as shown in the high-level flow diagram of FIG. 2. First, a face region belonging to a known person is located and segmented (i.e., extracted from) in a set of model images (process action 200). This is accomplished using any appropriate conventional face detecting/tracking system. The face pose data is also determined for each of the face regions extracted from the model images (process action 202), again via any appropriate conventional method. This process is then repeated, as indicated in process action 204, for each person it is desired to model in the face recognition system. The model images can be captured in a variety of ways. One preferred method would involve positioning a subject in front of a video camera and capturing images (i.e., video frames) as the subject moves his or her head in a prescribed manner. This prescribed manner would ensure that multiple images of all the different face pose positions it is desired to identify with the present system are obtained. For example, as will be described later in connection with the description of a tested embodiment of the present system and process, it was desired to solely track different head yaw positions. Thus, the subject was asked to face the camera while rotating their head from side to side.

All extracted face regions from the model images are preprocessed to prepare them for eventual comparison to similarly prepared face regions extracted from input images (process action 206). In general, this involves normalizing, cropping, categorizing and finally abstracting the extracted image regions so as to facilitate the comparison process. In one preferred embodiment of the pose-invariant face recognition system, the prepared face image representations are next used to train a bank of "face recognition" neural networks (process action 208). These face recognition neural networks constitute a first stage of a neural network ensemble that includes a second stage in the form of a single "fusing" neural network that is used to combine or fuse the outputs from each of the first stage neural networks. In process action 210, the prepared face image representations are used once again, this time to train the fusing neural network. The system is then ready to accept prepared input face images for identification purposes. To this end, the next process action 212 involves locating and segmenting one or more face regions from an input image. Here again, this can be accomplished using any appropriate conventional face detection/tracking system. Each extracted face region associated with a person that it is desired to identify is then prepared in a way similar to the regions extracted from the model images (process action 214) and input into the neural network ensemble one at a time (process action 216). Finally, as indicated by process action 218, the output of the neural network ensemble is interpreted to identify the person, and the pose data associated with each input (if desired). The pose data is optional because in some cases the face pose of a person is not of interest, and it is only desired to identify a person depicted in an input image. The pose-invariant face recognition and process according to the present invention is still very advantageous in such cases because a person can be recognized at a variety of face poses—a feature missing from existing recognition systems. In these cases the pose information that the system is capable of providing can simply be ignored.

1.1 Preprocessing Extracted Image Regions

Figure 3A:
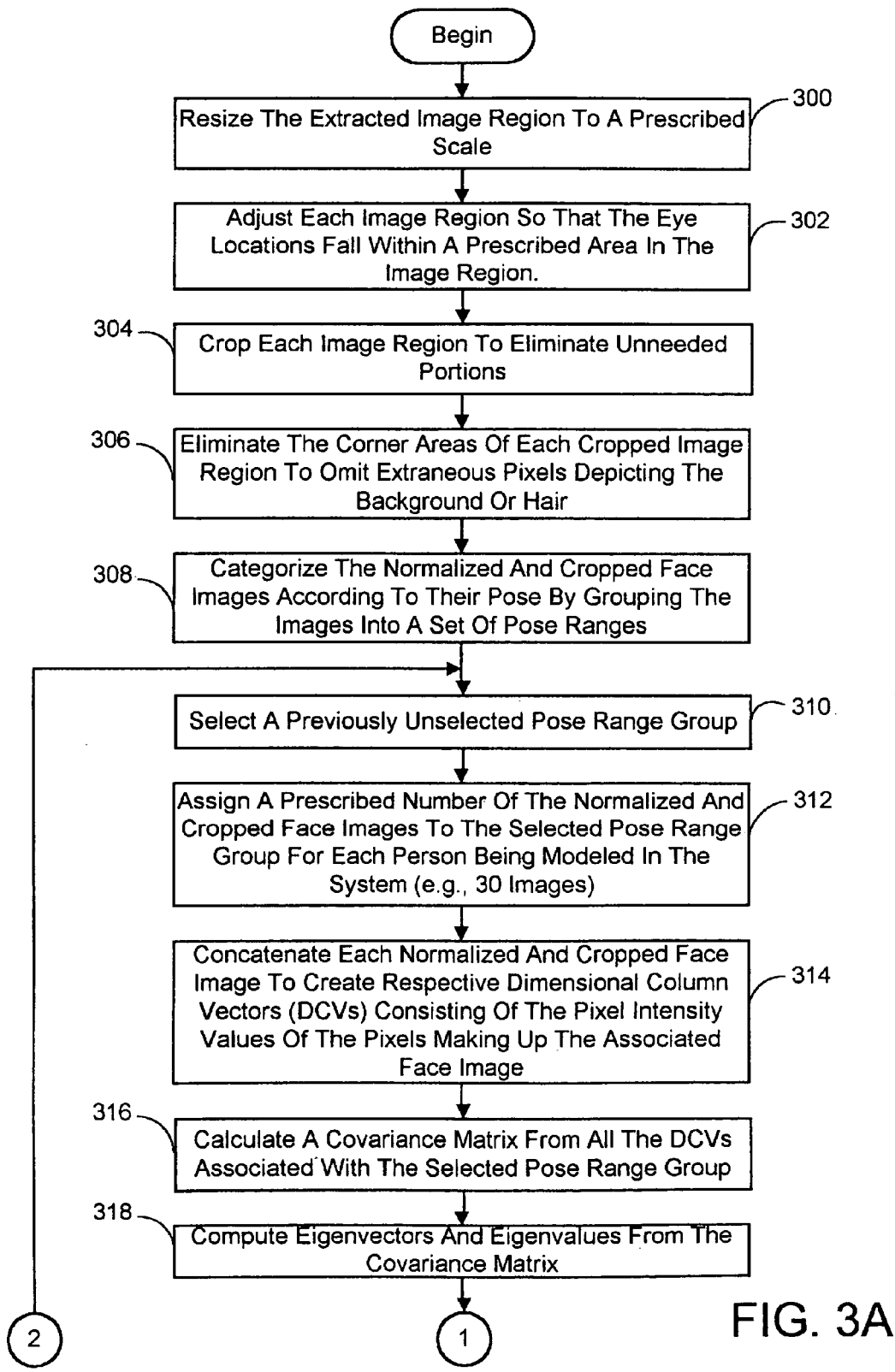
FIGS. 3A and 3B are flow diagrams of a process for accomplishing the preprocessing module of the overall process of FIG. 2.
Figure 3B:
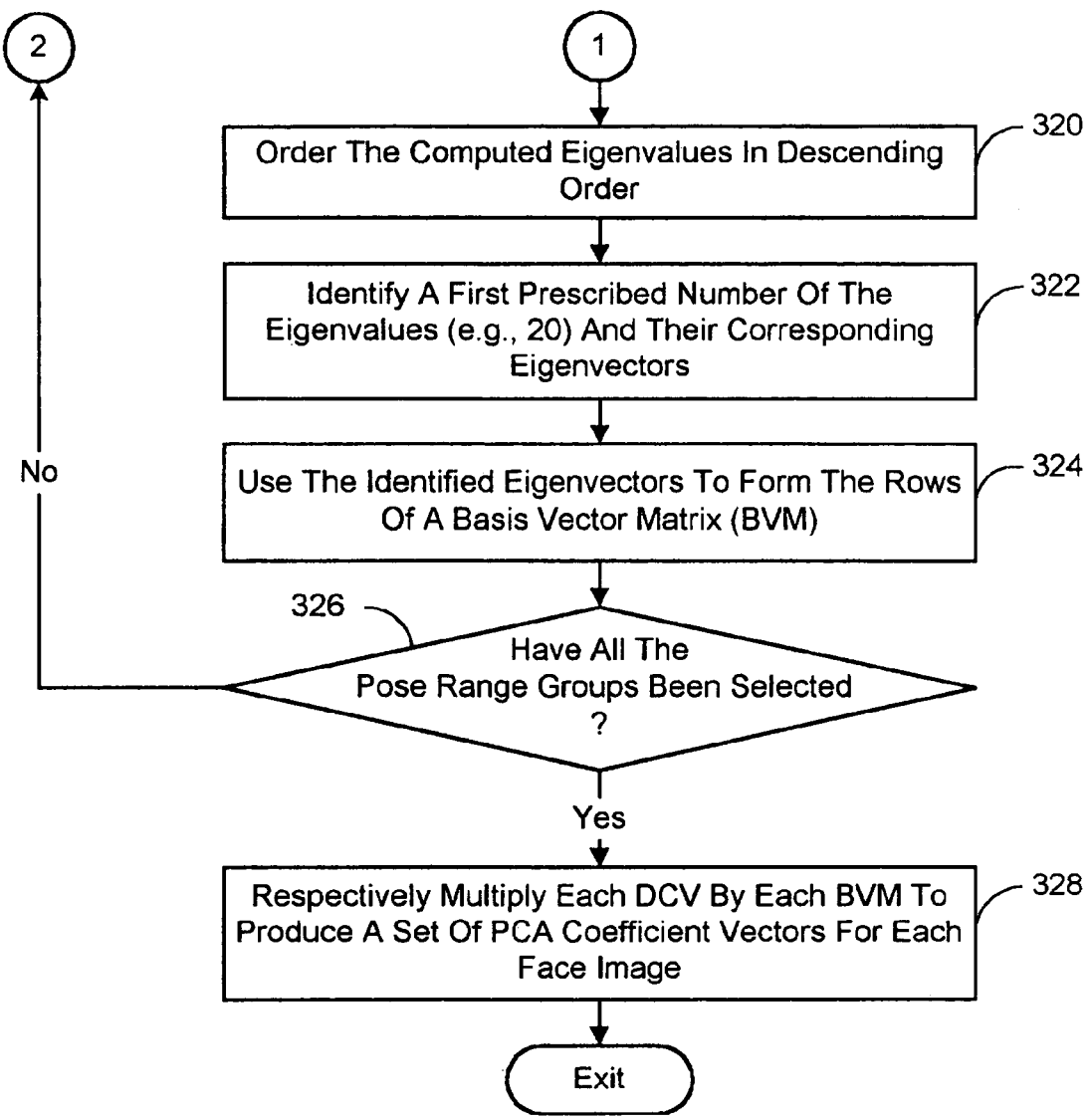

As mentioned above, the preprocessing action of the pose-invariant face recognition system involves normalizing, cropping, categorizing and abstracting the extracted image regions to facilitate the comparison process. Specifically, referring to FIGS. 3A and 3B, the preprocessing preferably entails normalizing the extracted image region to a prescribed scale (processing action 300). One conventional way of accomplished this task would be to detect the location of the person's eyes in the image region and computing the separation between these locations. The image region would then be scaled based on a ratio between the computed eye separation distance and a prescribed "normal" eye separation. It is noted that this action could be skipped if the images from which the face regions are captured at the desired scale thus eliminating the need for resizing. The image could additionally be normalized in regards to the eye locations within the image region (process action 302). In other words, each image region would be adjusted so that the eye locations fell within a prescribed area. These normalization actions are performed so that each of the extracted regions generally match as to orientation and size. The image regions are also cropped to eliminate unneeded portions which could contribute to noise in the upcoming abstraction process (process action 304). One standard way of performing the cropping is as follows. Essentially, the midpoint between the detected eye locations is calculated and any pixels outside a box surrounding the calculated midpoint are eliminating (i.e., the intensity is zero'ed). In addition, the corner areas of the box are eliminated to omit extraneous pixels depicting the background or hair from the resulting face image (process action 306). It is noted that the pose estimation action could optionally be performed at this stage, rather than prior to normalizing and cropping the extracted regions of the model images, if desired. Likewise, the extracted regions could be cropped first and then normalized, if desired. It is also noted that a histogram equalization, or similar procedure, could be employed to reduce the effects of illumination differences in the image that could introduce noise into the modeling process.

The next process action 308 of the model image preprocessing involves categorizing the normalized and cropped images according to their pose. One preferred way of accomplishing this action is to group the images into a set of pose ranges. For example, in the tested embodiment to be described later, the images were assigned to one of seven ranges based on the pose yaw angle (i.e., $-35°$ to $-25°$, $-25°$ to $-15°$, $-15°$ to $-5°$, $-5°$ to $+5°$, etc.). It is noted that while the tested embodiment involved a specific example where only the pose yaw angle was varied between model images (while the pitch and roll angle were set at $0°$), this need not be the case. Rather, the persons in the model images could be depicted with any combination of pitch, roll and yaw angles, as long as at least a portion of their face is visible. In such a case, the normalized and cropped images would be categorized into pose ranges defined by all three directional angles. The size of these pose ranges will depend on the application and the accuracy desired, but can be readily determined and optimized via conventional means.

The aforementioned abstracting preprocessing procedure is essentially a method of representing the images in a simpler form to reduce the processing necessary in the aforementioned comparison. Any appropriate abstraction process could be employed for this purpose (e.g., histograming, Hausdorff distance, geometric hashing, active blobs, and others), although the preferred method entails the use of eigenface representations and the creation of PCA coefficient vectors to represent each normalized and cropped face image. This preferred abstraction process begins as indicated by process action 310 with the selection of one of the aforementioned pose range groups. A prescribed number of the normalized and cropped face images assigned to the selected pose range group is then chosen for each person (process action 312). For example, in the aforementioned tested embodiment, 30 images were selected for each subject. These face images are respectively concatenated to create a dimensional column vector (DCV) for each image (process action 314). Each of these DCVs consists of the pixel intensity values of the pixels making up the associated face image. Preferably, the pixel's gray level intensity values are employed for this purpose, although other representations of pixel intensity or some other pixel characteristic could be used instead. Next, in process action 316, a covariance matrix is calculated from all the DCVs associated with the selected pose range group. Eigenvectors and eigenvalues are then computed from the covariance matrix (process action 318). The computed eigenvalues are ordered in descending order (process action 320), and a first prescribed number of these and their corresponding eigenvectors are identified (process action 322). In process action 324, the identified eigenvectors are used to form the rows of a basis vector matrix (BVM) specific to the associated pose range. As indicated by process action 326, actions 310 through 324 are repeated for each remaining pose range group. Then finally, in process action 328, each DCV is respectively multiplied by each BVM to produce a set of PCA coefficient vectors for each face region.

1.2 Training a Neural Network Ensemble to Recognize Persons and Face Poses.

If the process of capturing the model images, as well as the face extraction, pose estimation and preprocessing actions are very low noise operations, it would be possible to compare the PCA coefficient vectors computed from the model images with similarly prepared PCA coefficient vectors associated with input face images via some simple method such as an Euclidean distance method. In that case, the input image could be declared to depict the person associated with the model image whose computed PCA coefficient vector is the closest match to the PCA coefficient vector derived from the input image. The pose associated with the face of the identified person could also be declared to fall within the corresponding pose range of the closest matching model image PCA coefficient vector. If desired, a specific pose could be assigned to the identified person, for example a pose direction associated with the middle of the pose range.

However, most practical systems are going to introduce enough noise that the foregoing simple comparison process will not produce sufficiently accurate results for most applications. As a result, a neural network and, more specifically, a neural network ensemble is the preferred approach.

Figure 4:
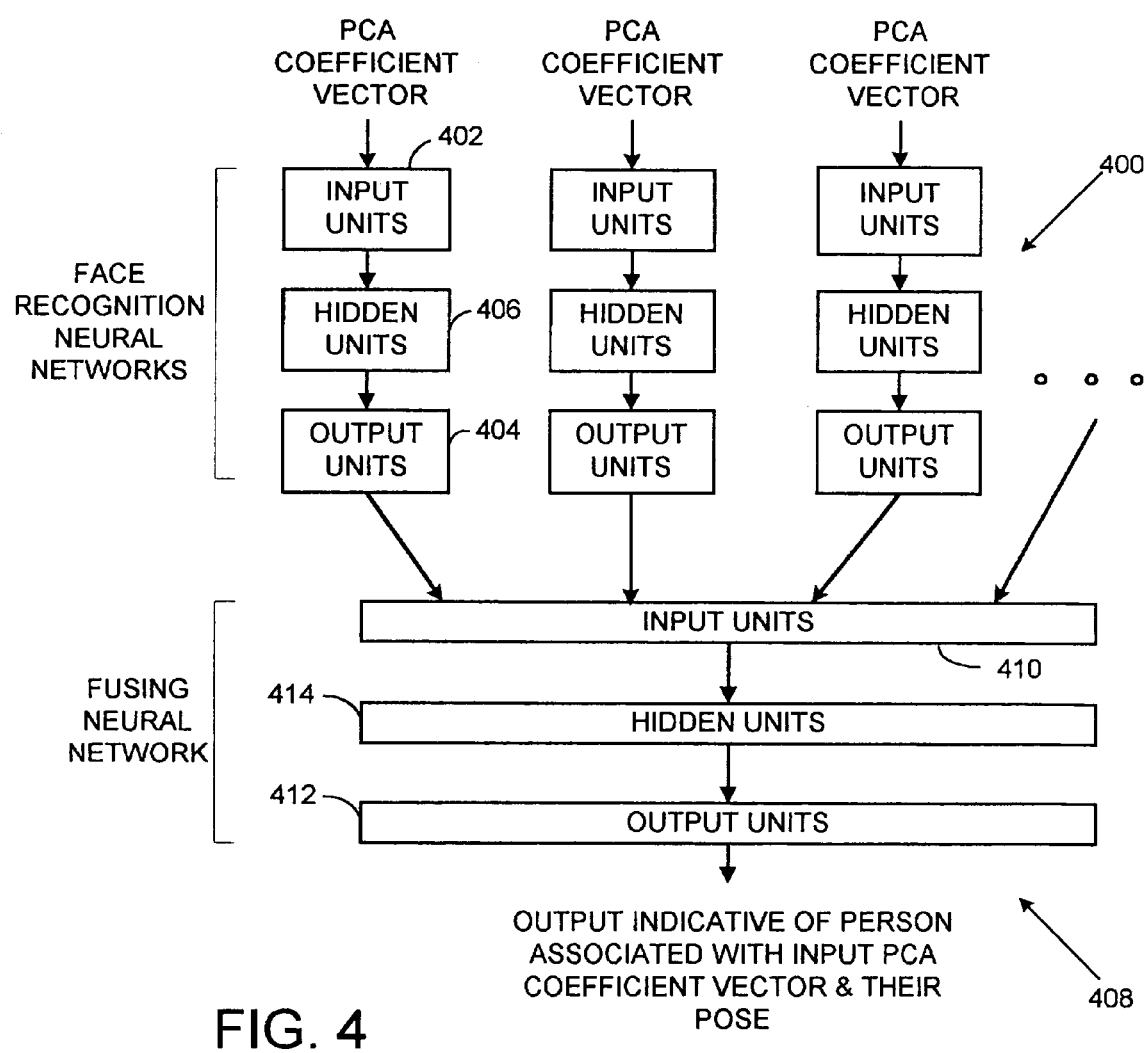
FIG. 4 is a block diagram of a neural network ensemble architecture that could be employed to accomplish the overall process or FIG. 2.

The preferred architecture of the proposed neural network ensemble and the reasons for employing such a network structure will be explored in detail in connection with a description of the aforementioned tested embodiment. However, a brief summary of the structure will be provided here to facilitate the following discussion of how the ensemble is trained and used to recognize persons depicted in input images. The preferred neural network ensemble has two stages and is depicted in simplified form in FIG. 4. The first stage is made up of a plurality of "face recognition" neural networks 400. Each of these face recognition neural networks 400 is dedicated to a particular pose range group. The number of input units or nodes 402 of each face recognition neural network equals the number of elements making up each PCA coefficient vector. This is because the PCA coefficient vector elements are input into respective ones of these input units 402. The number of output units or nodes 404 of each face recognition neural network equals the number of persons it is desired to recognize, plus preferably one additional node corresponding to an unknown (or "rejection") class. It is also noted that the output from each output unit 404 is a real-value output. Thus, the competition sub-layer typically used in an output layer of a neural network to provide a "winner takes all" binary output is not employed. The number of hidden layer units or nodes 406 is dependent on the number of input and output units 402, 404, and can be determined empirically.

The output units 404 of each of the face recognition neural networks 400 are fully connected in the usual manner with the input units 410 of the single "fusing" neural network 408 forming the second stage of the neural network ensemble. The number of input units 410 of the fusing neural network is equal to the number of first stage face recognition neural networks 400 multiplied by the number of output units 404 in each of the first stage neural networks. In addition, the number of output units 412 of the fusing neural network equals the number of input units 410. Since the number of output units 404 associated with each of the face recognition neural networks 400 is equal to the number of persons it is desired to identify with the face recognition system (plus one for an unidentified person), there will be enough fusing network output units 412 to allow each output to represent a separate person at a particular one of the pose range groups. Thus, it is advantageous for the output layer of the fusing neural network to include the aforementioned competition sub-layer so that only one output node is active in response to the input of a PCA coefficient vector into the first stage face recognition neural networks. In this way a single output node will be made active, and the person and pose associated with this active node can be readily determined. Finally, it is noted that the number of hidden layer units or nodes 414 in the fusing neural network 408 is determined empirically as with the face recognition neural networks 400.

Figure 5:
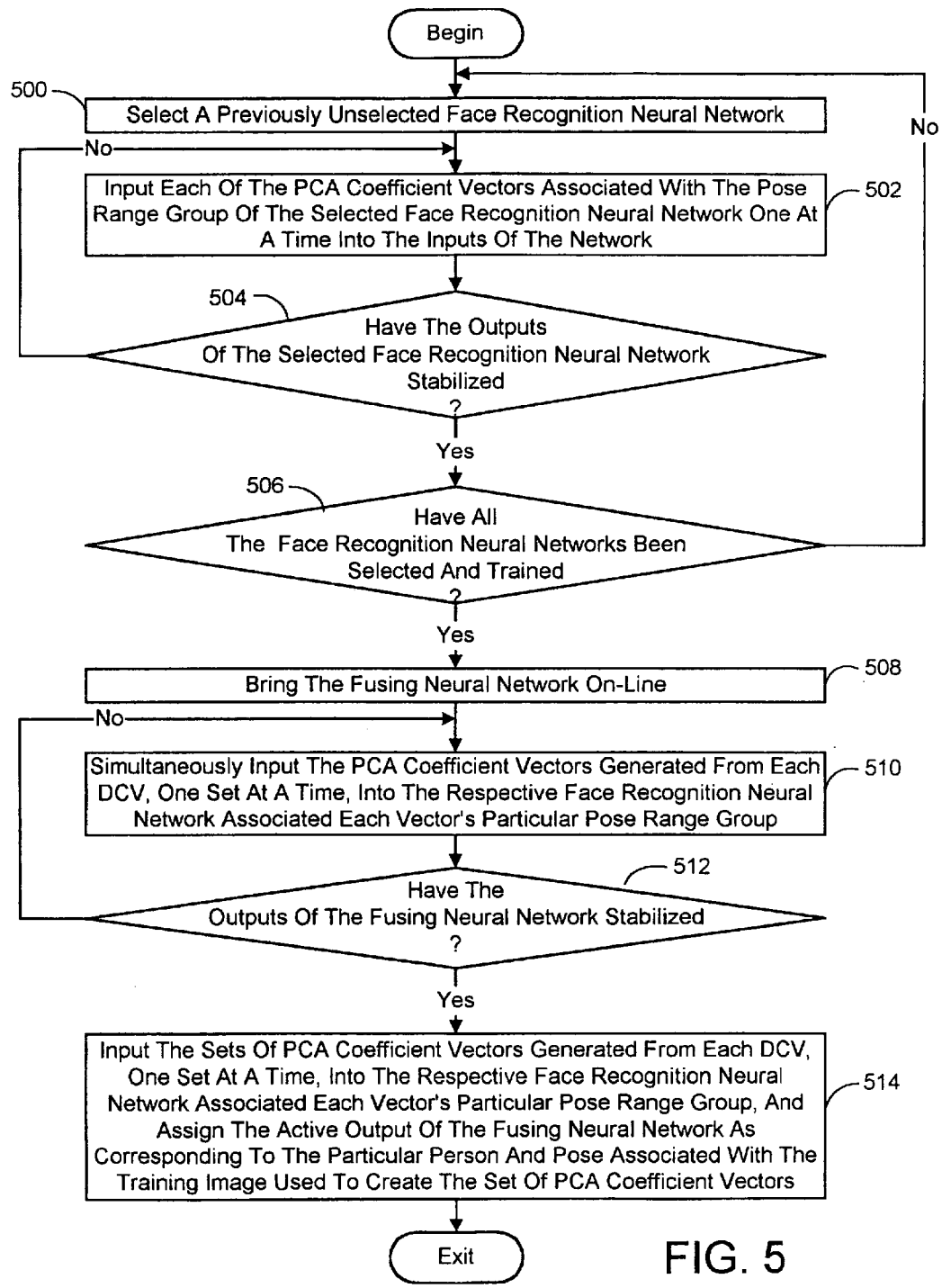
FIG. 5 is a flow diagram of a process for accomplishing the neural network training modules of the overall process of FIG. 2.

As indicated previously, to employ the neural network ensemble, the individual neural networks making it up must be trained. The face recognition neural networks of the first stage of the ensemble are trained as follows. Referring to FIG. 5, a previously unselected face recognition neural network is selected (process action 500). Then, each of the PCA coefficient vectors associated with the pose range group of the selected face recognition neural network are input one at a time into the inputs of the neural network (process action 502). As usual the corresponding elements of each PCA coefficient vector are input into the same input nodes of the selected neural network. As indicated in process action 504, the foregoing training action 502 is repeated until the outputs of the selected face recognition neural network stabilize (i.e., do not vary outside a prescribed threshold between training iterations). Next, in process action 506, it is determined if all the face recognition neural networks have been selected and trained. If not, a new face recognition neural network is selected and actions 500 through 504 are repeated. It is noted that any appropriate training algorithm can be employed to train the neural networks of the present ensemble. However, the algorithm that will be described in connection with the tested embodiment is preferred to ensure a speedy convergence.

Once all the face recognition neural networks have been trained, the fusing neural network is initialized for training (process action 508). To accomplish the training task, the PCA coefficient vectors generated from each DCV are, in turn, simultaneously input into the respective face recognition neural network associated each vector's particular pose range group (process action 510). This action 510 is repeated until the outputs of the fusing neural network stabilize, as indicated by process action 512. The sequence in which the sets of PCA coefficient vectors are input can be any desired. For example, in the aforementioned tested embodiment the PCA coefficient vector sets associated with a particular pose range group were all inputted before moving on to the next group and so on. However, it is actually believed that inputting the PCA coefficient vector sets in random order will cause the fusing neural network to stabilize more quickly.

Finally, in process action 514, the aforementioned sets of PCA coefficient vectors generated from each DCV are input one set at a time into the respective face recognition neural network associated each vector's particular pose range group, and the active output of the fusing neural network is assigned as corresponding to the particular person and pose associated with the model image used to create the set of PCA coefficient vectors.

1.3 Using the Neural Network Ensemble to Identify Persons and Face Poses Depicted in Input Images.

Figure 6:
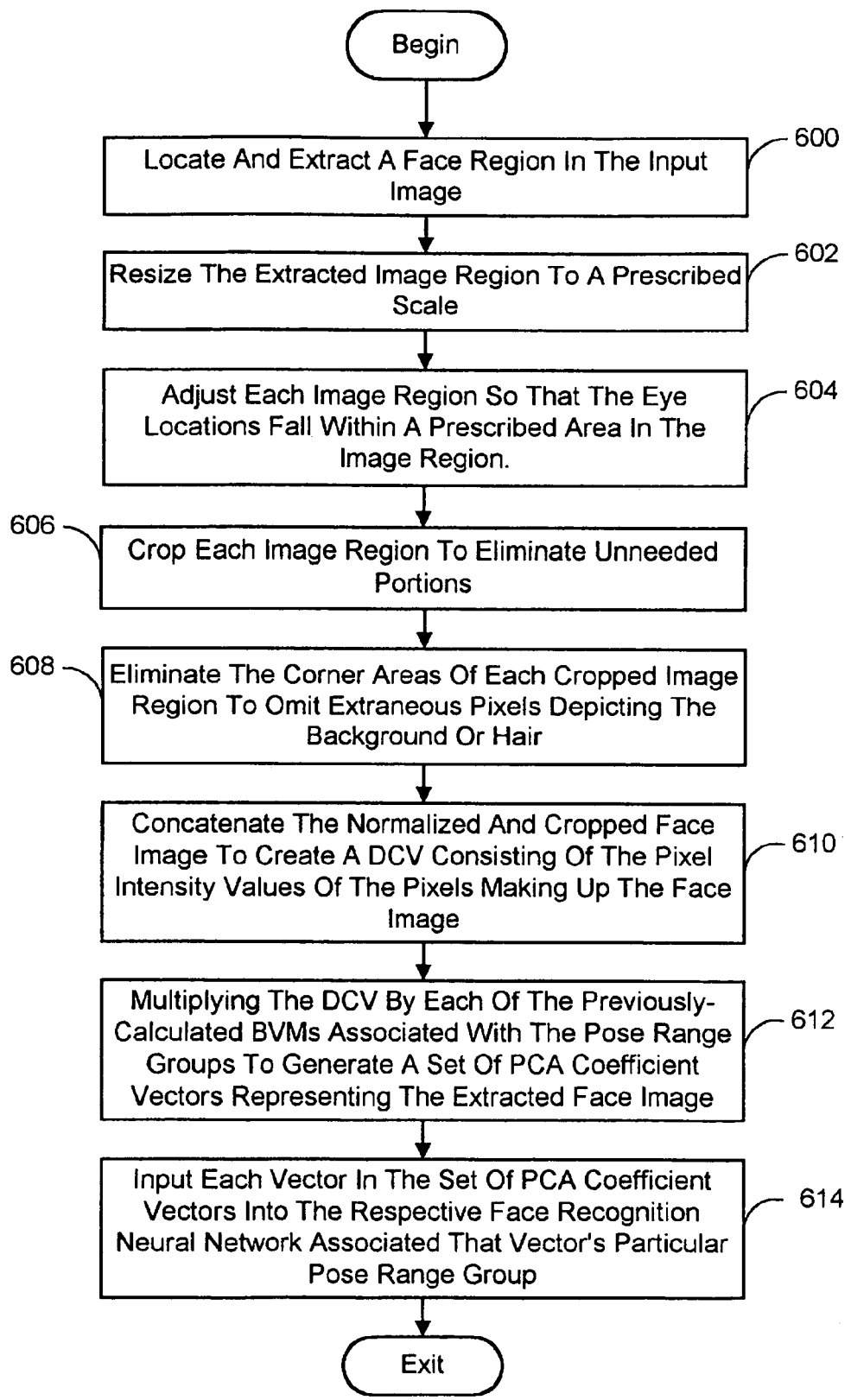
FIG. 6 is a flow diagram of a process for accomplishing the program modules of the overall process of FIG. 2 concerning extracting and preprocessing face images from an input image, and inputting them into the neural network ensemble for identification of the person depicted and the associated face pose.

The neural network ensemble is now ready to accept face image inputs associated with unidentified persons and poses, and to indicate who the person is and what pose is associated with the input face image. To input the image of an unidentified person, the face region is extracted from the input image, and then normalized and cropped, preferably using the procedures discussed in connection with preparing the model images as indicated by process actions 600 through 608 of FIG. 6. A DCV is then generated from the normalized and cropped face image as described previously (process action 610). A set of PCA coefficient vectors representing the extracted face image is generated by respectively multiplying the DCV by each of the previously-calculated BVMs associated with the pose range groups (process action 612). In the next process action 614, each vector in the set of PCA coefficient vectors is input into the respective face recognition neural network associated that vector's particular pose range group.

For each set of PCA coefficient vectors representing a face from the input image that is input to the ensemble, an output is produced from the fusing neural network having one active node. The person and pose previously assigned to this node is designated as the person and pose of the input image face region.

Preferably, at least one of the output nodes from the fusing network is also assigned as representing an unknown person. This can be accomplished by designing the neural network ensemble such that there is one or more output nodes of the fusing network one of which becomes active when none of the nodes assigned to known persons and poses is activated. When this node of the ensemble is activated in response to an inputted face image, the image is deemed to belong to a person of unknown identity and unknown pose.

2.0 Tested Embodiment.

The following sub-sections describe the present pose-invariant face recognition system and process in terms of a tested embodiment thereof. In doing so it is believed a better understanding of the invention can be obtained. However, it is not intended that the invention be limited to the specific parameters (e.g., the number of model images employed, the number of input units chosen for the face recognition neural networks, and so on) selected for the tested embodiment. Rather, it is believed the particular parameters best suited for the application to which the present invention is to be used can be readily chosen based on the foregoing and following description, and the selection criteria used in connection with the tested embodiment.

2.1 Data Acquisition.

In our tested embodiment, we collected face images of 10 subjects with different views using a Sony DV camcorder mounted on a tripod. Each subject was asked to sit in front of the camcorder and rotate their head horizontally to point his nose from a fixed position at the left side on the wall to another position at the right side. When the subject was looking at the left/right-most points, his head was rotated about ±30 degrees. The subject was asked to rotate his head continuously and smoothly between these two end points back and forth for 5 times. With a frame rate of 30 fps, we collected different numbers of images depending on the speed of the subject's head rotation. We used the images from the sequence as the training and test data, as will be discussed shortly. We restricted the rotation range to be between +30 and −30 degrees so that in the face images both of the subject's eyes were always visible. This made it easier to align the faces in a later stage, however would not be a necessary process action depending on the alignment algorithm employed.

2.2 Pre-Processing.

We created a data base having 10 subjects, all male, and in their twenties, and thus of generally similar appearance. This was done to rigorously test whether the face recognition system could differentiate between the subjects. For each subject, we collected a video sequence that had more than 1000 image frames. We separated images of the same sequence into 7 sets or groups, i.e., −35 to −25, −25 to −15, −15 to −5, −5 to +5, +5 to +15, +15 to +25, +25 to +35, and designated the groups as −30 degree, −20 degree, −10 degree, 0 degree, +10 degree, +20 degree, and +30 degree, respectively. Thus, for example, when it is stated in the following description that one image is of −10 degrees, we actually mean that the pose of the face in the image is between −15 and −5 degrees.

Figure 7:
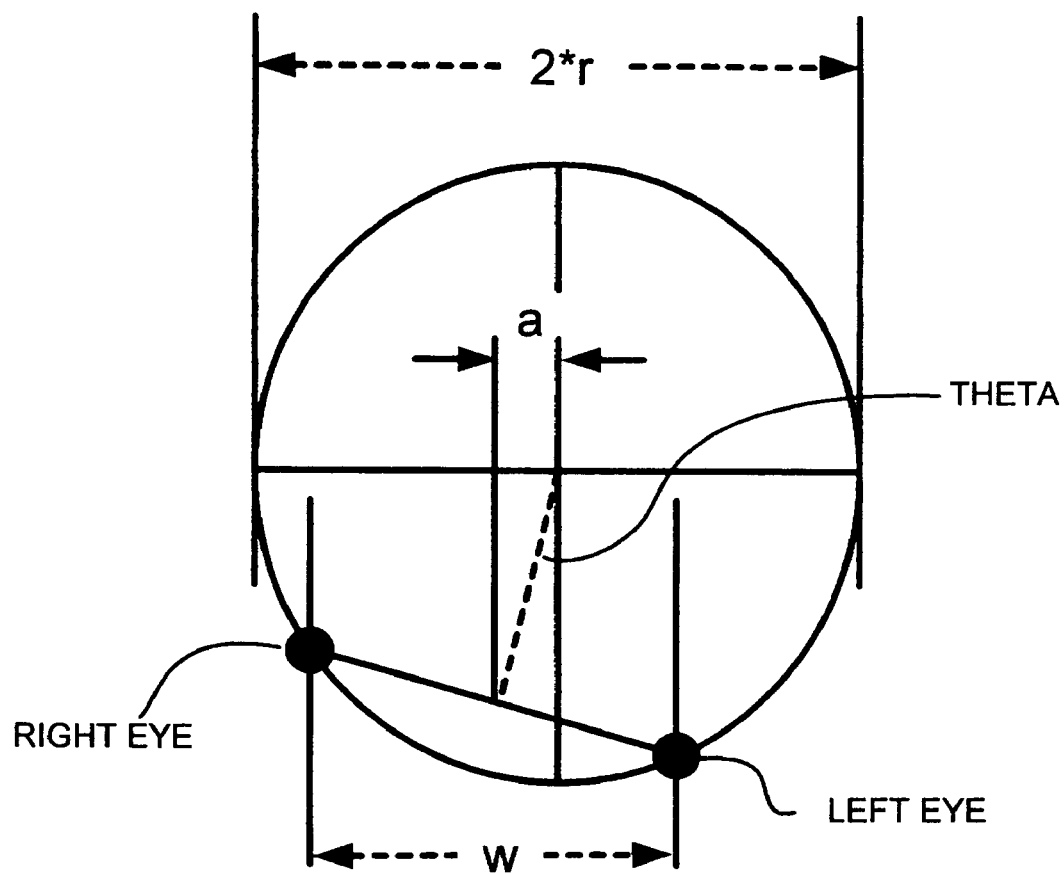
FIG. 7 is a diagram depicting the geometric relationships typically used to calculate the face pose of a person depicted in a face image based on the relative location of the person's eyes, as could be employed in conjunction with accomplishing the face pose estimation module of the overall process of FIG. 2.

To estimate the pose of the face in the image, we used the relative location of the eyes in the face. Referring to FIG. 7, we can calculate the distance a between the middle point of two eyes and the middle point of the face, and the radius of the head r (assuming the head has roughly a circular shape). Then we estimate the pose θ by:

$$\sin(\theta) = \frac{a}{r}$$

For each image sequence, we used a face detector to locate the face (bound by a rectangle) and the positions of the two eyes in the first image frame. Then for the frames that followed, we used a face tracker to track the locations of the face and eyes. The face tracker first modeled the face color distribution and used this information to deform a template, which fits with the face boundary. The tracker then tracks the eye position by searching for the center point of the pixels (which exhibit intensities are below a prefixed threshold) in a search window around the position of the eye in the previous frame.

When we shot the video for each subject, no special effort was made to keep the distance between the subject and the camcorder very precise. Therefore, the faces of different subjects may be in different scales. As a result, we needed to normalize the face images to the same scale. At the same time, when we cropped the face area from the whole image, we wanted to make the eyes of each subject to be in the same position in the normalized image. To accomplish this, we first used the distance between two eyes to normalize the face images.

Figure 8:
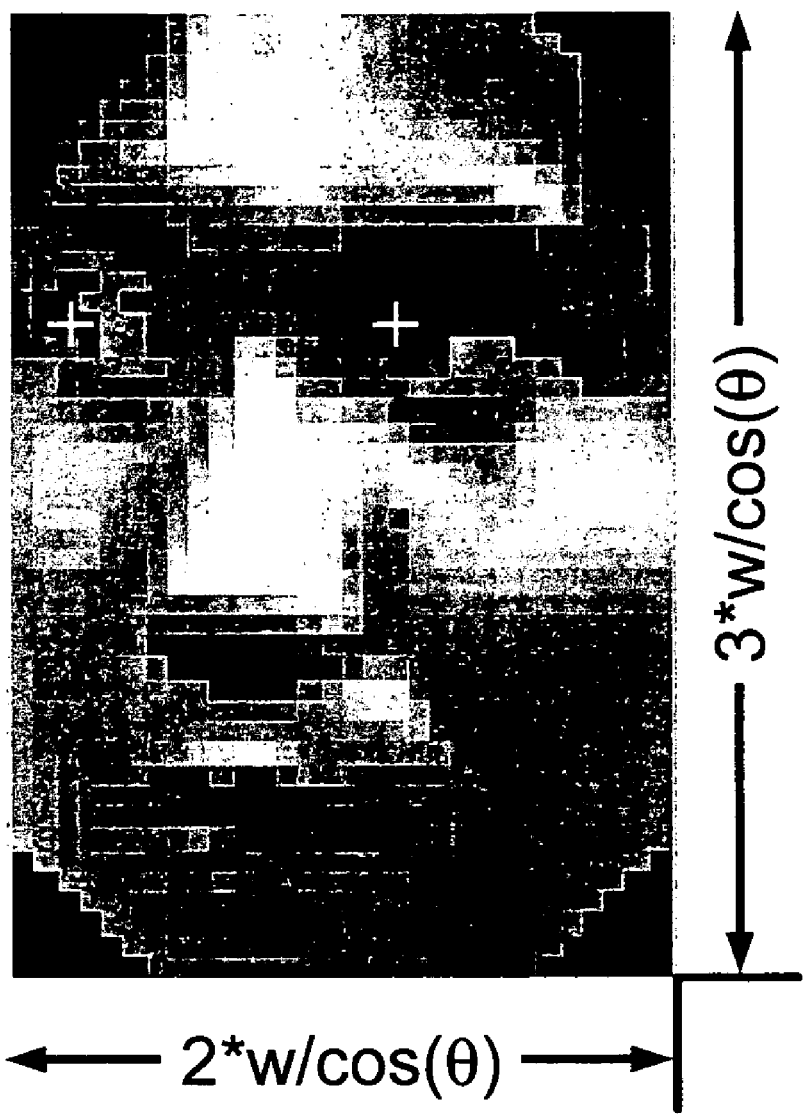
FIG. 8 is an image depicting a normalized and cropped face region as could be produced as part of the preprocessing process of FIGS. 3A and 3B.

The cropping process involved calculating the mid-point between the eyes of the subject depicted in the image under consideration. Then, we extended from the mid-point to the left side by $$\frac{w}{\cos(\theta)}(1-\sin(\theta)),$$

to top by $$\frac{w}{\cos(\theta)},$$

and cropped a $$\frac{3w}{\cos(\theta)}$$

by $$\frac{2w}{\cos(\theta)}$$

area to create the face image. The face image was then resized to be approximately 45 by 30 pixels. Also, we set the intensities of the four corners of the face image zero to eliminate any background or hair from the face image, as shown in FIG. 8.

Figure 9:
FIG. 9 is an image depicting a series of normalized and cropped face regions of ten different subjects as could be produced as part of the preprocessing process of FIGS. 3A and 3B.

An example of the cropped faces of all the subjects is shown in FIG. 9. It can be seen that all the faces are aligned according to the eye locations.

2.3 Feature Extraction.

Using the face image pixel intensities directly for recognition is computationally expensive and even impossible if we choose neural networks as the classifier. Therefore, it was desired to extract a group of features from the face image to produce a compact representation of the image. In our preferred approach, we projected the face images onto a face space spanned by a set of basis vectors. To deal with the view-varying problem, we built basis vector sets for each view (i.e., pose) individually. Specifically, a so-called eigenface approach was employed.

Eigenface based approaches have been used quite widely in the face recognition field for the frontal view face recognition partially because it's easy to use and has a solid mathematical background. The basic idea of the eigenface approach is to represent a face image in an optimal coordinate system, or in the other words, to decompose the face image into a weighted sum of several "eigen" faces. The eigenfaces can be thought of as the basis vectors of a coordinate system, which expand a face space. One of the optimal criteria is that the mean-square error introduced by truncating the expansion is a minimum. This method's mathematical foundation is the Karhunen-Loeve Transformation, or Principle Component Analysis (PCA).

Figure 10:
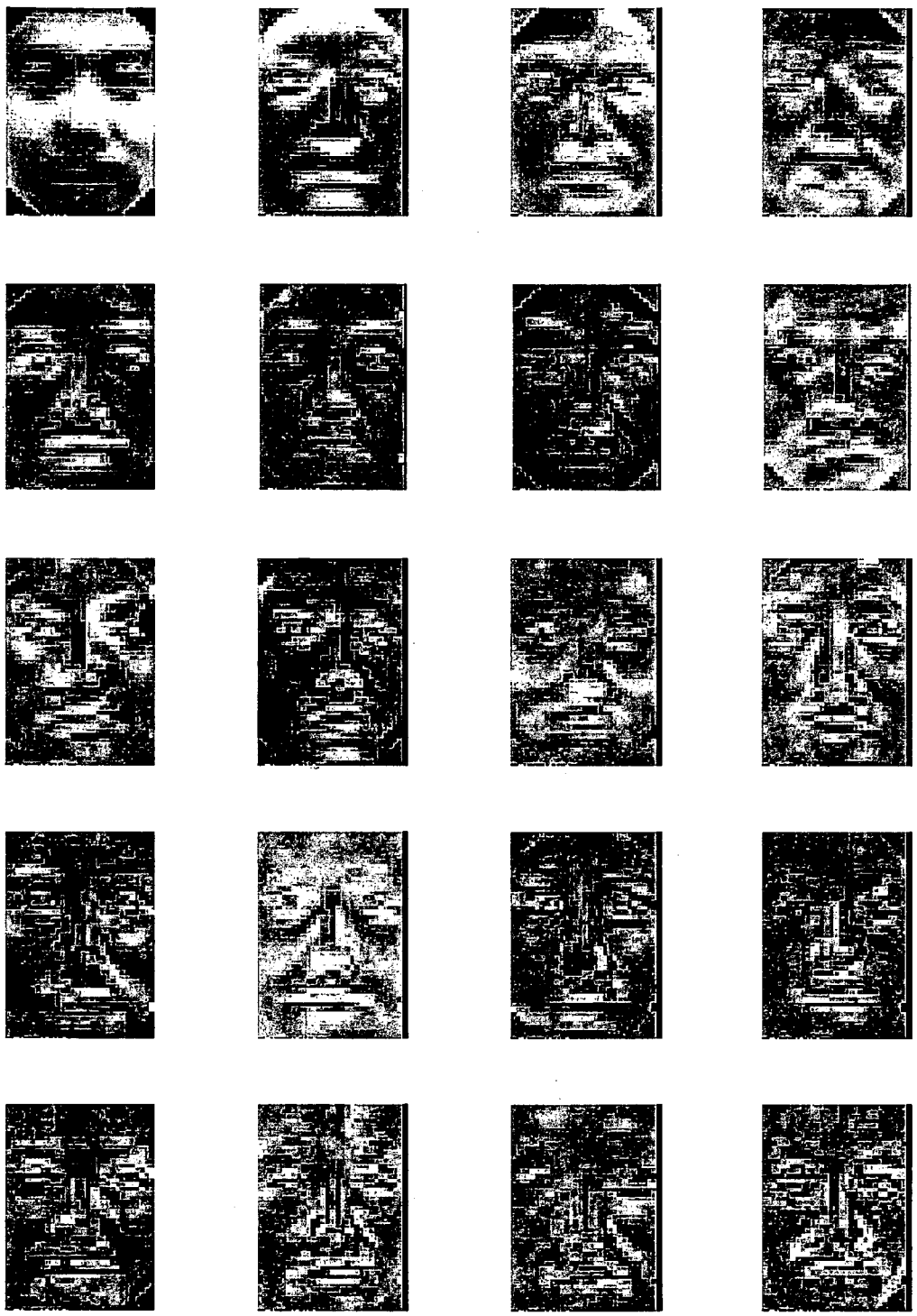
FIG. 10 is an image depicting an example of an eigenface set associated with a pose range group centered at 0 degrees as could be produced as part of the preprocessing process of FIGS. 3A and 3B.

We chose 30 images from each subject at a specific view degree, say, 0 degree, and use these 300 face images to build the eigenfaces. First, we concatenated all the rows in one face image (45×30) to get a 1350 dimensional column vector $f_i$ $i=1\ldots300$. Then, we calculated the covariance matrix of these vectors, which is a 1350×1350 matrix. Next, we computed the eigenvectors and corresponding eigenvalues of this matrix. We ordered the eigenvalues decendantly, and chose the first 20 eigenvalues and the corresponding eigenvectors. These 20 eigenvectors can be seen as the basis vectors of the face space. All the face images can be projected onto this face space by multiplying the image vector with the eigenface set, i.e., $$\underbrace{\begin{bmatrix} | \\ 20 \\ | \end{bmatrix}}_{a} = \underbrace{\begin{bmatrix} | & & | \\ 20 & - & 1350 & - \\ | & & | \end{bmatrix}}_{e} * \underbrace{\begin{bmatrix} | \\ 1350 \\ | \end{bmatrix}}_{b}$$

where b is the column vector of the face image to be projected, the rows of the matrix e are the eigenvectors computed above, and the result a is the 20 PCA coefficients. The PCA coefficients a can be seen as the feature vector of the image b. This feature vector is in a much lower dimensional space compared with the intensity image. The feature vector can be used as the input to a classifier, which could be Euclidean distance based or some other appropriate approach. However, in the tested embodiment, the preferred Neural Network approach was employed for the reasons discussed previously. An example of the eigenfaces we built for the 0 degree face images can be seen in FIG. 10.

With the PCA coefficients a and the eigenfaces e, we can actually reconstruct the original face image by multiplying them as:

$$b' = e^T \cdot a$$

Figure 11:
FIG. 11 is an image depicting an example of a reconstructed face image (left) compared to the original face image (right).

FIG. 11 shows one example of the reconstructed face image b' (left), compared with the original image b (right). It can be seen that the reconstructed face image looks very close to the original image, which means the 20 PCA coefficients adequately captured most of the information of the appearance of the face from the corresponding face image.

The eigenface approach is easy to apply into the feature extraction portion of the process. But it also has the problem that it is difficult to extend it to multiple viewing conditions. Murase and Nayar [8] proposed a "universal" eigenspace by including images of different viewing conditions of different objects when calculating the eigenvectors. In this universal eigenspace the different views of one object makes a "manifold", and different objects make different manifolds. As such, it is possible to recognize both pose and identity in this space. But it has been found that the reconstruction quality of images in such a universal eigenspace is not satisfying. Thus, a different approach should be taken.

It is natural to think of creating individual eigenface space for each different view. By projecting a face image into the corresponding eigen space, the reconstruction quality will be much better than in the universal eigen space, which means the feature extraction process will capture more useful information from the original intensity image. We adopted this approach in our tested embodiment.

Figure 12:
FIG. 12 is an image depicting an example of an eigenface set associated with a pose range group centered at 20 degrees as could be produced as part of the preprocessing process of FIGS. 3A and 3B.

Specifically, we calculated 4 eigenface sets for the 0 degree images, 10 degree images, 20 degree images, and 30 degree images, respectively. One example of the eigenface set for the 20 degree view is shown in FIG. 12.

2.4 Classifier—Neural Networks.

A neural network ensemble has been shown to generate better predictive result than single neural net and has been applied to many fields, such as handwritten digit recognition [9], OCR [10], speech recognition [11], and seismic signals classification [12]. Thus, it was believed that a neural network ensemble could be successfully employed as a classifier in our tested face recognition system and process. The only similar work we found in face area is performed by S. Gutta and H. Wechsler [13, 14]. They used decision trees to detect facial landmarks, then used an ensemble of RBF networks to perform recognition. However, they only deal with frontal views. And they only "recognize" whether a new face belongs to a "known" face set. In other words, their work would be more appropriately called verification instead of recognition. The following description reports the results of our work in applying neural network ensemble to a face recognition process.

2.4.1 First Layer Neural Networks: View-Specific Classifier.

The training algorithm employed in all the single nets was of the Back-Propagation (BP) type, which is the most prevailing neural network algorithm at present. However, we made some minor modification. The weight-adjusting equation of standard BP is:

$$\Delta w(n) = \alpha \frac{dE(n)}{dW} + \varepsilon \Delta w(n-1) \quad (1)$$

The weight-adjusting equation we used is:

$$\Delta w(n) = \alpha \frac{dE(n)}{dW} + \varepsilon \frac{dE(n-1)}{dW} \quad (2)$$

It is noted that the momentum in equation (1) is related to multi-step gradients, while the momentum in equation (2) is only related to two step gradients. Our experiments show that equation (2) is faster than equation (1) in our problem domain. However, the difference is only in training speed. So, other BP algorithms can also be used without any influence on the recognition result.

The number of output units is determined by the number of persons to be recognized by the system. Moreover, since we also would like to consider "rejection", we used another unit to denote this class. The term rejection means that the person associated with a face input into the system does not match any of the modeled subjects. For example, if we want to recognize 10 persons, we should use 11 units, among which 10 units respectively denote the 10 persons and the remaining one denoting the rejection class.

In our tested embodiment we used 6 output units for all the first-layer neural networks. The reason is that we have the data of 10 persons, and we wished to recognize 5 persons while using the remaining 5 persons to test the rejection capabilities of the system.

The number of input units are preferably made equal to the number of features selected. Since we use an eigenface approach to defining image features, there are two possible choices. First, we could use the anterior 20 eigenvectors, that is, eigenvector 0~19. Alternatively, we could exclude the anterior 2 eigenvectors, and use only eigenvectors 2~19. The former approach corresponds to having 20 input units, and the latter corresponds to 18 input units. We experimented to determine whether 20 or 18 input units would be better. The results of this experimentation for determining the number of input units is shown below in Table 1. It is noted that in Table 1, as well as the remainder of the description, the term "angle" or notation "angle '±xx" will be used to identify the various pose groups described previously.

TABLE 1

| | | 20 inputs | | 18 inputs | |
| --- | --- | --- | --- | --- | --- |
| | hidden units | training epoch | Accuracy | training epoch | accuracy |
| Angle'0 | 10 | 177 | 10% | 145 | 90% |
| | 15 | 168 | 99% | 191 | 90% |
| | 20 | 231 | 86% | 158 | 90% |
| | 25 | 167 | 90% | 350 | 80% |
| Angle'-20 | 10 | 182 | 92.632% | 230 | 91.579% |
| | 15 | 215 | 95.789% | 265 | 93.684% |
| | 20 | 254 | 84.211% | 425 | 77.895% |
| | 25 | 212 | 89.474% | 514 | 30.526% |

For each angle, we trained 8 networks, among which 4 used 20 inputs and 4 used 18 inputs. Since we have not determine the number of hidden units, we tried 4 hidden unit configurations, that is, 10, 15, 20, and 25. Each network was trained with 350 images. For angle '0 networks, the training data consists of '0 faces mapped with an angle '0 eigenvector; for angle '−20 networks, the training data consists of all angle '−20 faces mapped with an angle '−20 eigenvector. The accuracy is achieved through a test set. For angle '0 networks, the test set is composed of 100 angle '0 faces mapped with the angle '0 eigenvector; for angle '−20 networks, the test set is composed of 95 angle '−20 face images mapped with the angle '−20 eigenvector. From Table 1 it can see that for angle '0 networks, 20 inputs are better than 18 inputs, when the number of hidden units is 10 or 15, and 18 inputs is better than 20 inputs, when the number of hidden units is 20 or 25. Thus, 20 and 18 units tie for angle '0 networks. However, when we considered angle '−20 networks, 20 inputs is undoubted the winner. So, we chose 20 input units for all the first-layer neural networks. A possible explanation for the results is that since 20 inputs encode more information than 18 inputs, the neural network with 20 input units could attain better results.

The data presented in Table 1 is also helpful in determining a preferred number of the hidden units. The pertinent data is shown in Table 2. Since we have already chosen 20 inputs, we only consider the column labeled as "20 input accuracy" in Table 1.

TABLE 2

|  | hidden units | training epoch | 20 input accuracy |
|---|---|---|---|
| Angle'0 | 10 | 177 | 10% |
|  | 15 | 168 | 99% |
|  | 20 | 231 | 86% |
|  | 25 | 167 | 90% |
| Angle'-20 | 10 | 182 | 92.632% |
|  | 15 | 215 | 95.789% |
|  | 20 | 254 | 84.211% |
|  | 25 | 212 | 89.474% |

It is obvious that 15 hidden units could achieve the best predictive result no matter what the angle. Thus, we choose 15 hidden units for all the first-layer neural networks.

Each training set used to train the face recognition neural networks was composed of 300 images, all of which were specific angle faces mapped with the same angle eigenvector. For example, the training set of the Angle '0 network is composed of 300 angle '0 faces mapped with an angle '0 eigenvector. Among the 300 images, each of the 5 persons to be recognized has 40, and each of the 5 persons to be rejected has 20.

The test set was constructed in the same way as that of the training set, except that there were 100 images in it instead of 300. Among the 100 images, each person has 10 no matter whether he is to be recognized or to be rejected.

2.4.2 Second Layer Neural Network: Information Fusion

One possibility of interpreting the results of the first-layer neural networks would be to employ a voting approach. Voting with multiple neural network classifiers could generate results with low cost [15, 16]. However, we found voting cannot be used in our task. For example, assume that we have an angle 'a image belonging to person A, and we have 3 networks which respectively corresponding to angle a, b and c. Now we simultaneously map the image with those three eigenvectors and feed it into the three networks. There is a large possibility that the output of the angle 'a network would be "A", while the outputs of the remaining two networks would be "Rejection". Thus, the results of the "voting" would be a "Rejection" since there would be two votes for rejection and only one vote for "A". This is contrary to what we want.

The reason for this result can be explained as follows. When we use multiple learning systems to learn a certain problem, the information present to those learning systems is uniform (or near uniform). So, all the learning systems have an equal right to "express" their "opinion" to the entire problem. In that situation, voting could work. However, when the information presented to the learning systems is different to some extent, they only have the right to "express" their "opinion" to their specific problem, that is, a sub-problem. Thus, voting could not work.

Here is a parable that may explain this problem more clearly. Assume we have a patient and 3 doctors. If the doctors are all general practitioners, we may ask them to check the patient comprehensively. Then we could ask the doctors whether the patient suffering from a certain disease. Since all the doctors get uniform information, their conclusion is comparable. Thus, we could get the final diagnosis through voting all the doctors' opinions. However, if the doctors are all specialists, we can only ask them to check a particular aspect of the patient. For example, doctor A checks the patients eyes, doctor B checks the patient's ear, and doctor C checks the patient's hand. In this situation, we cannot use voting to get the final diagnosis because doctor A can only know whether the patient suffering from an eye disease (we exclude those highly skilled doctors who can know ear conditions through only checking eye, etc.), doctor B can only know whether the patient suffering from an ear disease, and so on. Asking doctor B or C's opinion about whether the patient is suffering from an eye disease is of no use. However, if we have doctor D, who is neither a general practitioner nor a specialist experienced in checking eyes, ears or hands. Instead, doctor D is experienced in combining the opinions of specialists in those fields. Then we can get the final diagnosis from him. This is analogous to using a special neural network to combine the outputs of the first-layer neural networks, as will be discussed next. Note that many experts each adept at one aspect are more easily hired than many experts adept at all aspects. This is another reason why we do not use voting.

From the foregoing discussion it can be seen that the second-layer neural network is also an "expert", just like all the first-layer neural networks. The only difference is that they are adept at different aspect. So, it is natural that the second-layer neural network adopts the same training algorithm.

The number of input units of the second-layer neural network should be the sum of the number of outputs of all the first-layer neural networks. Assuming there are m first-layer neural networks, each has n outputs. The second-layer neural network has q inputs:

$$q=mn \tag{3}$$

In our tested embodiment, since m=4, n=6, the second-layer neural network has 24 input units.

If the first-layer neural networks were neural network classifiers, when a new face is fed in, the network will generate an output vector, in which the component denotes the corresponding class is "1" while the others are all "0". Directly using those binary vectors to train the second-layer network is not practicable. The reason is that a "conflict" can easily occur while combining multiple first-layer neural networks' outputs. For example, when person A's angle '0 face is fed into angle '0 network, the output may be [1, 0, 0, 0, 0, 0], where the first component 1 denotes present face belonging to A. When the same face is fed into the angle '-20 network, the output may be [0, 0, 0, 0, 0, 1], where the last component be 1 denotes present face should be rejected. The reason is that the face has been "distorted" by the angle '-20 eigenvector, thereby misleading the angle '-20 network to regard it as a face of a person to be rejected. Thus, when combining those two vectors, we get [1, 0, 0, 0, 0, 0, 0, 0, 0, 0, 0, 1]. On the other hand, when an angle '-20 face of person K who should be rejected fed into angle '-20 network, the output may be [0, 0, 0, 0, 0, 1]. When the same face fed into angle '0 network, the output may be [1, 0, 0, 0, 0, 0] because the face has been "distorted" by the angle '0 eigenvector and so misleading the angle '0 network into regarding it as the face of person A. Thus, when combining those two vectors, we get [1, 0, 0, 0, 0, 0, 0, 0, 0, 0, 0, 1] again.

As can be seen a conflict occurs. If the training set is flooded with such data, the training process cannot converge. However, this situation can be avoided. The solution involves deep insight into neural network classifiers.

Typically, a neural network classifier is 3-layer architecture. The first is the input layer, the second is the hidden layer, and the third is the output layer. However, if we take a deeper look, we will find that the function of the output layer can be split into two sub-layers. The real-value output sub-layer receives the feed-forward values sent from the hidden units, while the competition sub-layer performs a WTA (Winner-Take-All) competition among all the real-value outputs. The unit with the resulting largest activation value is labeled as "1", while the others are labeled as "0". If we "cut off" the competition sub-layer, we will get a neural network regression estimator. It generates a real-value vector instead of binary vector. If we combine multiple such real-value vectors coming from multiple networks, the "conflict" described above is not likely to occur. For example, the corresponding real-value vectors generated according to [1, 0, 0, 0, 0, 0, 0, 0, 0, 0, 0, 1] may be [0.92, 0.01, 0.01, 0.02, 0.01, 0.01, 0.03, 0.06, 0.04, 0.05, 0.02, 0.11] and [0.17, 0.01, 0.01, 0.02, 0.01, 0.01, 0.03, 0.06, 0.04, 0.05, 0.02, 0.85]. The former corresponds to person A and the latter corresponds to person K. It is obvious that there is not any conflict.

Figure 13:
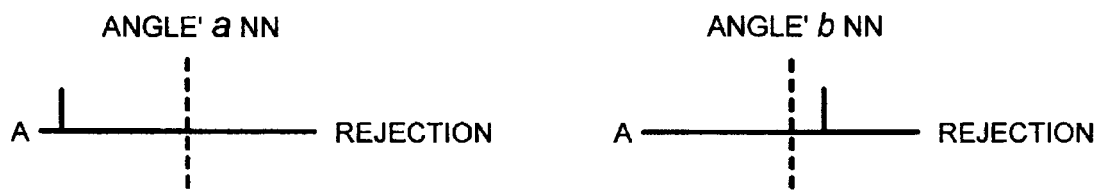
FIGS. 13(a) and 13(b) are diagrams graphically illustrating the real value output of two simple neural networks trained to decide whether an input image belongs to one of two classes, namely "A" and "Rejection" (i.e., not "A"). The diagram on the left in each figure represents a network trained to recognize an image of "A" at angle 'a and the diagram on the right in each figure represents a network trained to recognize an image of "A" at angle 'b. When an angle 'a image belonging to A is fed to the neural networks, the output of the neural networks would be depicted by FIG. 13(a). When an angle 'b image belonging to the Rejection class (i.e. not "A") is fed to the neural networks, the outputs would be depicted by FIG. 13(b).
Figure 13:
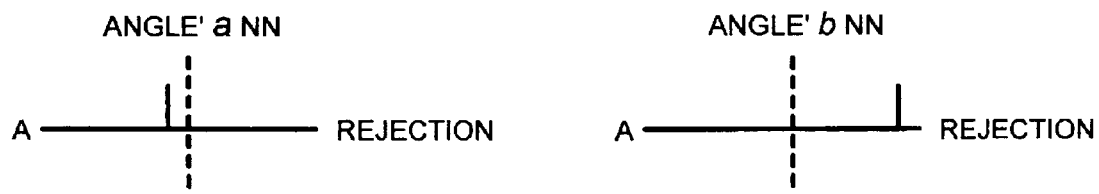

The elimination of "conflict" could be explained from a geometric view. Imagine there are only two classes, namely A and Rejection, and there are two simple neural networks each having only one output (In fact, these would not really be neural networks. However, in order to expatiate clearly, we use a very simple example. The classes here can be easily divides by lines.). The two neural networks are trained for different angles: a and b. Their function is to assign "A" to an input that locates left of the middle line, while assigning "Rejection" to an input that locates to the right of the middle line. When an angle 'a image belonging to A is fed to the neural networks, the output of the neural networks would be depicted by FIG. 13(a). When an angle 'b image belonging to the Rejection class is fed to the neural networks, the outputs would be depicted by FIG. 13(b). It should be noted that although the real-value outputs are different, the binary outputs are same. That is, angle 'a network gives out "A" and angle 'b network gives out "Rejection".

Figure 14:
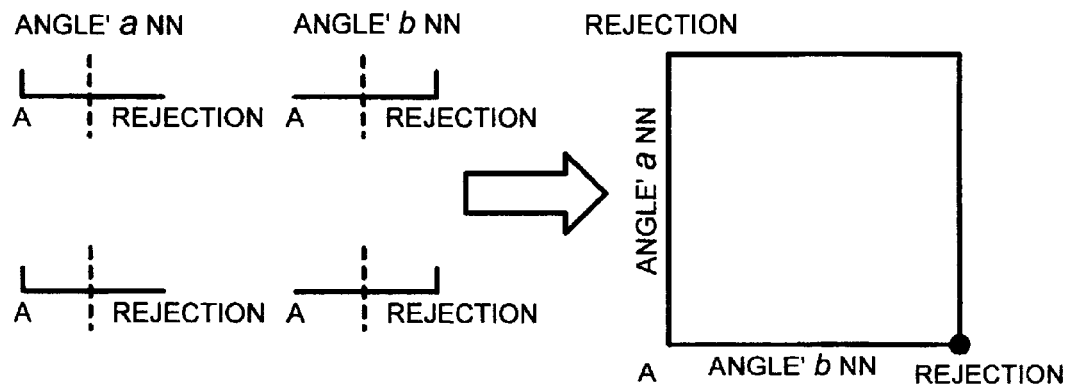
FIGS. 14(a) and 14(b) are diagrams graphically illustrating the results of combining the outputs of the neural networks of FIGS. 13(a) and 13(b) where in FIG. 14(a) the results of combining binary outputs of the networks are shown on the far right and in FIG. 14(b) the results of combining real value outputs of the networks is shown on the far right.
Figure 14:
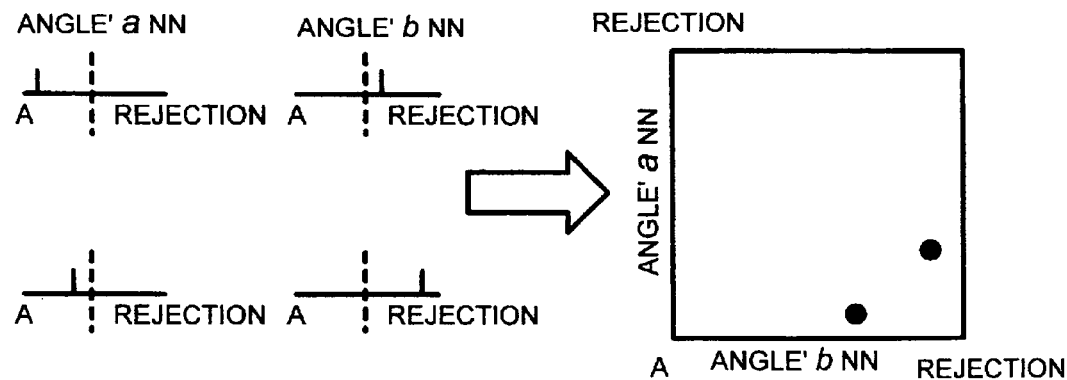

There is large difference between combining binary output vectors and combining real-value output vectors. The former corresponds to the situation depicted in FIG. 14(a). It is obvious that those two images cannot be classified. The latter corresponds to the situation depicted in FIG. 14(b). Those two images are easily to be classified.

Figure 15:
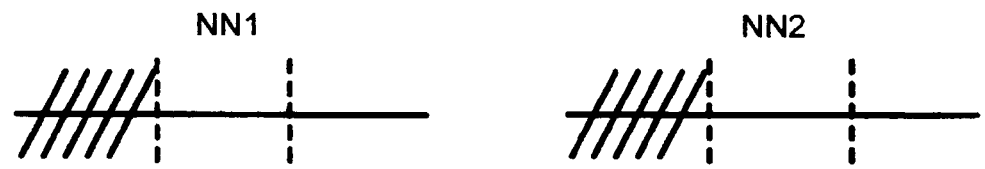
FIGS. 15(a) through 15(d) are diagrams graphically illustrating the real value output ranges of two simple neural networks divided into three sectors. The diagram on the left in each figure represents the output of the first of the two networks and the diagram on the right in each figure represents the second of the two networks. When person A's angle 'a image is fed into the networks, the output ranges would be depicted by FIG. 15(a). When person A's angle 'b image is fed into the networks, the output ranges would be depicted by FIG. 15(b). When person B's angle 'a image is fed into the networks, the output ranges would be depicted by FIG. 15(c). And finally, when person B's angle 'b image is fed into the networks, the output ranges would be depicted by FIG. 15(d).
Figure 15:
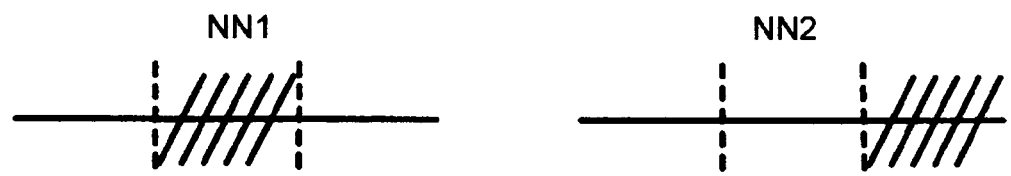
Figure 15:
Figure 15:
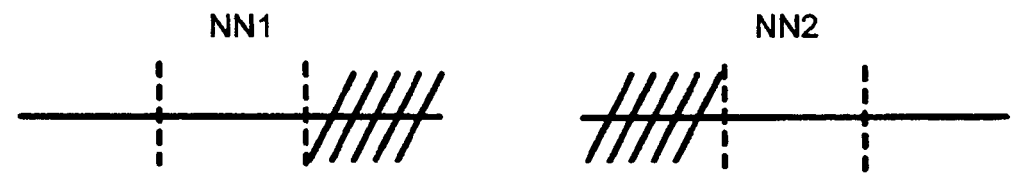
Figure 16:
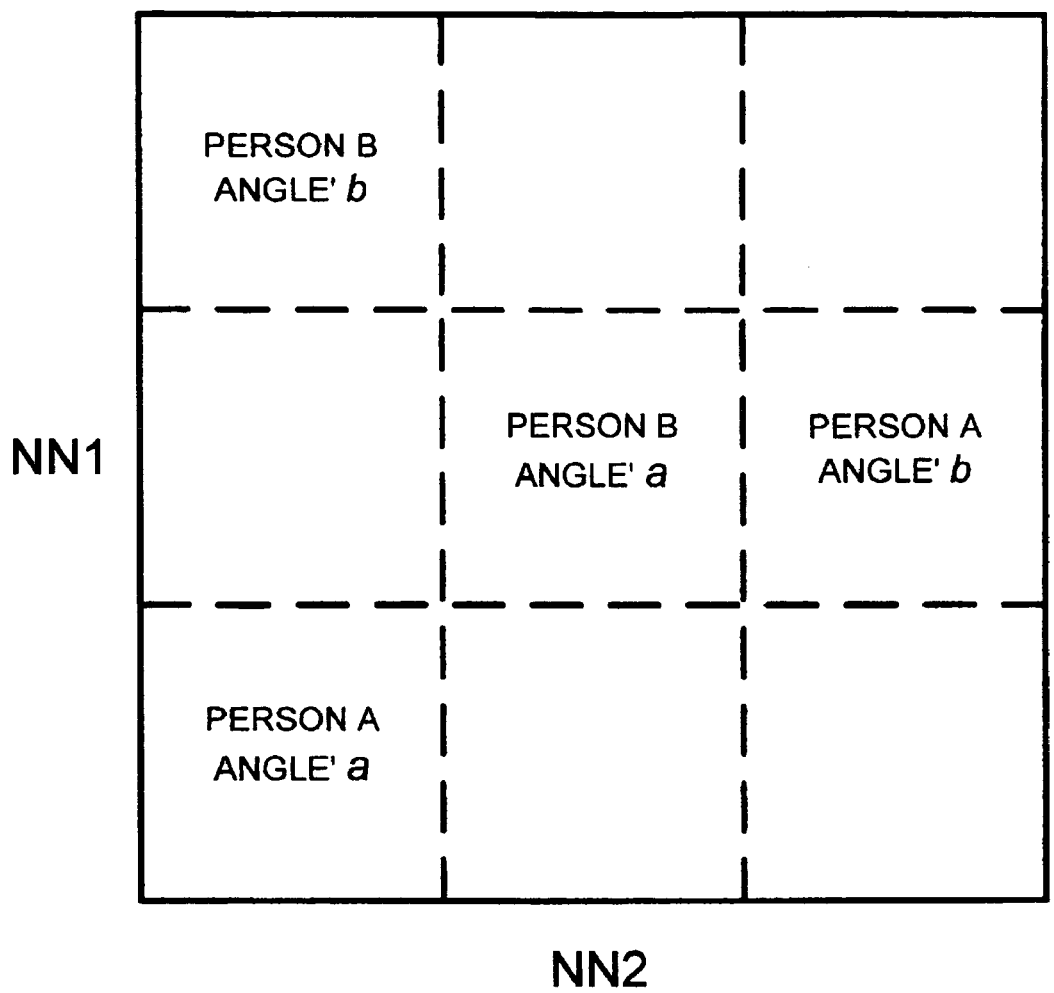
FIG. 16 is a diagram graphically illustrating the results of combining the outputs of the neural networks of FIGS. 15(a) through 15(d), respectively.

Combining multiple first-layer neural networks could be regarded as a dimension-incrementing process. For example, in our tested embodiment, the outputs of the first-layer neural networks are 6-dimensional vectors. After combining, there is a 24-dimensional vector. Although no first-layer neural network can indicate the pose of a face in the input image, the second-layer neural network can because it combines all the information from the first-layer neural networks. This phenomenon can be explained through a simple geometric parable. Assume there are two simple neural networks each having only one output. When person A's angle 'a image is fed into the networks, the output ranges would be depicted by FIG. 15(a). When person A's angle 'b image is fed into the networks, the output ranges would be depicted by FIG. 15(b). When person B's angle 'a image is fed into the networks, the output ranges would be depicted by FIG. 15(c). And finally, when person B's angle 'b image is fed into the networks, the output ranges would be depicted by FIG. 15(d). It is clear that no single neural network can indicate both the person and the pose. However, if we combine those two neural networks together, it becomes a simple matter as depicted in FIG. 16.

For the second-layer network, the number of the output units is preferably equal to that of the input units. In our tested embodiment, that number was 24. It is noted that the second-layer neural network is a neural network classifier. That is, there is one and only one unit that will be active at any time, while all other units will be inhibited. Thus, when active, each unit could represent not only the person whose face is depicted in the input image, but also represent the face pose of that person. Thus, this architecture is practical to our task.

In our tested embodiment, the number of the hidden units of the second-layer network is also 15 and the results achieved with that configuration were satisfactory.

The training set used to train the second-layer network was composed of 1200 instances each having 24 components. The first 300 were generated as follows. First, each angle '0 image from the training set of the angle '0 network is respectively mapped according to eigenvector '0, eigenvector '−10, eigenvector '−20 and eigenvector '−30. Then, the resulting eigen vectors were respectively fed into the four networks. The output was 4 real-value vectors for each image because each image was mapped with 4 eigenvectors and fed to 4 networks. Those four 6-dimensional real-value vectors were then merged into a 24-dimensional real-value vector at the input of the second-layer neural network. The output of the second-layer neural network was a 24-dimensional binary vector, in which the component denoting both the identity of a person and the associated face pose would be set to "1", while all the other components would be set to "0". The remaining 900 instances were generated in the same way, except that the original images were from the training set of angle '−10, angle '−20 and angle '−30 networks, successively.

The test set was composed of 400 instances each having 24 components. It was generated in the same way as the training set.

3.0. Testing

The following sub-sections provide a description of testing performed using the above-described tested embodiment of the pose-invariant face recognition system and process, or variations thereof. The results of these tests are also presented.

3.1. Single Neural Network

In the first experiment using the above-described tested embodiment, we trained a single view-specific neural network. When new images were fed into a particular first-layer neural network, they were first mapped with the eigenvector corresponding to the network.

We trained four single networks, namely, angle '0, angle '−10, angle '−20 and angle '−30, respectively. All the networks were of the aforementioned 20-15-6 architecture; that is, they had 20 input units, 15 hidden units and 6 output units. Each training set had 300 view-specific images, and each test set had 100 view-specific images (except that the "angle 'all" test set had 400 images which were the sum of the four test sets). The sampling method was the same as described in Section 2.4.2. The experimental results of the single view-specific neural networks are shown in Table 3.

TABLE 3

| training | | test set | | | |
|---|---|---|---|---|---|
| | epoch | angle'0 | angle'-10 | angle'-20 | angle'-30 | angle'all |
| angle'0 net | 187 | 98% | 81% | 69% | 53% | 75.25% |
| angle'-10 net | 158 | 79% | 96% | 84% | 54% | 78.25% |
| angle'-20 net | 249 | 52% | 93% | 97% | 72% | 78.5% |
| angle'-30 net | 204 | 44% | 68% | 73% | 97% | 70.5% |

From Table 3 it can be seen that when there is an accurate pose estimation process before the single neural network, the recognition rate is quite good (i.e., an average of 97%). However, when the pose estimation process is unavailable, the recognition rate will be very poor (i.e., an average of 75.625%).

Moreover, from Table 3 it can be seen that for a certain network, if the angle of the test set is the same to that of the network, it achieves the highest accuracy. The accuracy decreases with the increasing distance of the angle.

3.2. Ensemble 1: Angle '0 and Angle '-20.

In the second experiment, we trained two view-specific first-layer neural networks, and trained a second-layer neural network to combine them. The learning method was as described in Section 2.0 et seq. The only difference is that the second-layer neural network had a 12-15-12 architecture instead of a 24-15-24 architecture, and the training set was composed of 600 instances instead of 1200 instances.

Table 4 shows the experimental results of the first-layer neural networks.

TABLE 4

| training | | test set | | |
|---|---|---|---|---|
| | epoch | angle'0 | angle'-20 | angle'all |
| angle'0 net | 187 | 98% | 69% | 75.25% |
| angle'-20 net | 249 | 52% | 97% | 78.5% |

The second-layer neural network required 43 epochs to converge. The final ensemble results are shown in Table 5. The "recognition rate" shown in the table indicates how many images were correctly classified as to the identity of persons, whereas the "pose rate" indicates how many images were correctly classified according to poses. The "overall rate" indicates how many images are correctly classified according to not only persons but also poses.

TABLE 5

| | test set | | |
|---|---|---|---|
| | angle'0 | angle'-20 | angle'all |
| recognition rate | 100% | 94% | 97% |
| pose rate | 94% | 83% | 88.5% |
| overall rate | 94% | 81% | 87.5% |

In comparing Table 4 and Table 5, it can be seen that when there is an accurate pose estimation process before the first-layer neural networks, a high recognition rate was achieved (i.e., an average of 97.5%), but when the pose estimation process is unavailable, the recognition rate was very poor (average 76.875%). However, the recognition rate of the ensemble is quite good. If considering some experimental error, the recognition rate of the ensemble was the same as that of the single neural networks with accurate pose estimation.

3.3. Ensemble 2: Angle '0 and Angle '-20.

In the third experiment, we also trained two view-specific first-layer neural networks, and trained a second-layer neural network to combine them. All the experimental configurations were the same as that described in Section 3.2, except that the training data was organized in a different way. In Section 3.2, we used a training set composed of 300 images for each first-layer networks. The training set of the second-layer network was the sum of those images transferred by the first-layer networks. That is, there are 600 instances in the second-layer network's training set. However, in the present experiment, we used only half the set to train the first-layer networks. That is, there were only 150 images in each training set. On the other hand, the training set of the second-layer network was still composed of 600 instances. The purpose of this alternate training set configuration was to augment the robustness of the second-layer network.

The test set was same as that used in Section 3.2. The second-layer network used 39 epochs to converge. The experimental results for the third experiment are shown in Table 6 and Table 7. Specifically, Table 6 shows the experimental results of the first-layer neural networks and Table 7 shows the experimental results of the ensemble.

TABLE 6

| training | | test set | | |
|---|---|---|---|---|
| | epoch | angle'0 | angle'-20 | angle'all |
| angle'0 net | 194 | 99% | 83% | 91% |
| angle'-20 net | 262 | 56% | 96% | 76% |

TABLE 7

| | test set | | |
|---|---|---|---|
| | angle'0 | angle'-20 | angle'all |
| recognition rate | 96% | 97% | 96.5% |
| pose rate | 94% | 88% | 91% |
| overall rate | 94% | 86% | 90% |

As can be seen, the experimental results indicate that the ensemble is not significantly more robust than the ensemble of Section 3.2. There are 3 possible explanations. First, maybe the method does not work for augmenting the robustness. Second, maybe the images are noisy so that the robustness has already been achieved in Section 3.2 by the variation among the data. And third, maybe the training data organization is not optimal. That is, maybe we should use less data to train the first-layer networks and use more data to train the second-layer network.

3.4. Ensemble 3: Angle '0 to Angle '−30.

The fourth experiment is our most important. We trained four view-specific first-layer neural networks, and trained a second-layer neural network to combine them. The learning method was described in Section 2.0 et seq. The second-layer network used 129 epochs to converge. Table 8 and Table 9 show the experimental results of the fourth experiment. Table 8 shows the experimental results of the first-layer neural networks and Table 9 shows the experimental results of the ensemble.

TABLE 8

| | training | test set | | | | |
|---|---|---|---|---|---|---|
| | epoch | angle'0 | angle'−10 | angle'−20 | angle'−30 | angle'all |
| angle'0 net | 187 | 98% | 81% | 69% | 53% | 75.25% |
| angle'−10 net | 158 | 79% | 96% | 84% | 54% | 78.25% |
| angle'−20 net | 249 | 52% | 93% | 97% | 72% | 78.5% |
| angle'−30 net | 204 | 44% | 68% | 73% | 97% | 70.5% |

TABLE 9

| | test set | | | | |
|---|---|---|---|---|---|
| | angle'0 | angle'−10 | angle'−20 | angle'−30 | angle'all |
| recognition rate | 98% | 98% | 100% | 99% | 98.75% |
| pose rate | 93% | 20% | 68% | 91% | 68% |
| overall rate | 93% | 20% | 68% | 91% | 68% |

From Table 8 and Table 9 it can be seen that the ensemble achieves the highest recognition accuracy. It is especially noteworthy that the ensemble without pose estimation produced a recognition rate having an average of 98.75%, which is even better than the best single neural network with accurate pose estimation (i.e., an average of 97%).

In addition, from Table 7 and Table 9 it can be seen that the recognition rate does not decrease with the increasing pose angles. Instead, the recognition rate even increases. One possible explanation is that the classes become more easily classified with increasing information fed into the ensemble, as we have detailed in Section 2.4.2. However, we surmise that there may exist an upper bound for the increasing of the angles. Below the bound, the classes are more and more easy to classify as the number of angles increasing. While beyond the bound, the classes may become more and more difficult to classify as the angles increase.

Further, from Table 7 and Table 9 it can be seen that the pose accuracy decreases with increasing pose angles. It seems that the pose estimation of the ensemble is not scalable. However, the pose estimation of the images belonging to angle '0 or angle '−30 in Table 9 are quite good. The latter is the images belonging to angle '−10 or angle '−20. After checking the data, we found that many angle '−10 images are regarded as angle '0 or angle '−20 images; and that many angle '−20 images are regarded as angle '−10 or angle '−30 images. There are three possible explanations. First, maybe the pose estimation performed by the ensemble is really not scalable. Second, maybe the pose data we provided to the neural networks was noisy. That is, the pose information of the images is not accurate and some similar images may be regarded as belonging to different angles in the training set. And finally, maybe the 10° interval is too small to be accurately distinguished.

4.0 Alternate Embodiments.

While it is believed the previously-described neural network ensemble employing first stage neural network classifiers will provide a more robust result, it is not intended that the present invention be limited to such classifiers. For example, rather that employing a face recognition neural network for each face pose range, a Nearest Neighbor classifier or some other conventional type of classifier, could take its place. The output of these alternate types of classifiers would be a measure of the similarity between an input image and a set of known face images at the particular pose range to which the classifier is being dedicated. For example, this measure of similarity could be a "distance" measurement (such as a simple Euclidean distance) that is indicative of how closely a PCA coefficient vector computed from the model images associated with a particular person at a particular pose range matches a similarly prepared PCA coefficient vector associated with an input face image. In this way, instead of having to train each classifier using PCA coefficient vectors computed from model images of each person at a particular pose range (as is the case with the first stage face recognition neural networks), a single coefficient vector would be derived from the model images for each person, which would be representative of the person's face having a pose falling within the particular pose range. This could be accomplished in a variety of ways. For example, one can create a model PCA vector, as described previously, from a model image of a known person having a known pose range. This model PCA vector, along with others representing other people associated with the same pose range, would be input into the face recognition classifier dedicated to the pose range associated with the PCA vectors. This process would be repeated for each classifier based on the pose range exhibited by the model images used to produce the model PCA vectors. Each of the face recognition classifiers would compare the representative coefficient vectors associated with each person to a similarly prepared coefficient vector derived from an input image, and then output a similarity vector made up of values respectively indicating the similarity of a face extracted from the input image to each of the representative coefficient vectors. The values making up the similarity vector would preferably be normalized to fall between 0 and 1 to facilitate its input into the second stage neural network. The inputting is accomplished as it was in the neural network ensemble embodiment of the present invention. An alternate embodiment such as described above would be more susceptible to noise in the input image, however, the training requirements are simplified as only the second stage neural network need be trained. As such, the alternate classifier embodiments may be more suited to applications where the training of multiple first stage neural networks would be considered too onerous.

REFERENCES

[1] R. Brunelli and T. Poggio, "Face Recognition: Features versus Templates," IEEE Trans PAMI.
[2] M. Kirby and L. Sirovich, "Application of the Karhunen-Loeve Procedure for the Characterization of Human Faces," in IEEE Trans PAMI.
[3] T. Cootes, G. Edwards, and C. Taylor, "Active Appearance Models," ECCV.
[4] D. Beymer, "Face Recognitio Under Varying Pose," AI Memo 1461.
[5] D. Beymer and T. Poggio, "Face Recognition From One Model View," Proc. Fifth Int'l Conf. Computer Vision, 1995.
[6] T. Vetter and T. Poggio, "Linear Object Classes and Image Synthesis From a Single Example Image," IEEE Trans PAMI.
[7] A. Pentland, B. Moghaddam, and T. Starner, "View-Based and Modular Eigenspaces for Face Recognition," IEEE CVPR.
[8] S. Nayar, H. Murase, and S. Nene, "Parametric Appearance Representation," Early Visual Learning.
[9] Hansen L K, Liisberg C, Salamon P. Ensemble Methods for Handwritten Digit Recognition. In: *Proceedings of the 1992 IEEE SP Workshop,* 1992, Vol. 2, 333~342.
[10] Filippi E, Costa M, Pasero E. Multi-layer Perceptron Ensembles for Increased Performance and Fault-Tolerance in Pattern Recognition Tasks. In: *Proceedings of the 1994 IEEE International Conference on Neural Networks,* 1994, Vol. 5, 2901~2906.
[11] Kirkland J. Squad-based Expert Modules for Closing Diphthong Recognition. In: *Proceedings of the Second New Zealand International Two-Stream Conference on Neural Networks and Expert Systems,* 1995, 302~305.
[12] Shimshoni Y, Intrator N. Classification of Seismic Signals by Integrating Ensembles of Neural Networks. *IEEE Transactions on Signal Processing,* 1998, 46(5): 1194~1201.
[13] Gutta S, Wechsler H. Face Recognition Using Hybrid Classifier Systems. In: *Proceedings of the 1996 IEEE International Conference on Neural Networks,* 1996, Vol. 2, 1017~1022.
[14] Gutta S, Huang J, Takacs B, Wechsler H. Face Recognition Using Ensembles of Networks. In: *Proceedings of the 13th International Conference on Pattern Recognition,* 1996, Vol. 4, 50~54.
[15] Hansen L, Salamon P. Neural Network Ensembles. *IEEE Transactions on Pattern Analysis and Machine Intelligence,* 1990, Vol. 12, 993~1001.
[16] Russo A P. Constrained Neural Networks for Recognition of Passive Sonar Signals Using Shape. In: *Proceedings of the IEEE Conference on Neural Networks for Ocean Engineering,* 1991, 69~76.

Wherefore, what is claimed is:

1. A computer-implemented face recognition process for identifying a person depicted in an input image, comprising:
creating means for creating a database of a plurality of model image characterizations, each of which represents the face of a known person that it is desired to identify in the input image as well as the person's face pose;
training means for training a neural network ensemble to identify a person and their face pose from a region which has been extracted from said input image and characterized in a manner similar to the plurality of model images, wherein the network ensemble comprises, a first stage having a plurality of classifiers each of which has input and output units and is dedicated to a particular pose range and outputs a measure of the similarity indicative of the similarity between said characterized input image region and each of said model image characterizations associated with the particular pose range of the classifier, and a fusing neural network as its second stage which combines the outputs of the classifiers to generate an output indicative of the person associated with the characterized input image region and the face pose of that person and which has at least enough output units to allow a different output to represent each person it is desired to identify at each of the pose ranges, and wherein training the neural network ensemble comprises,
preparing each model image characterization from a model image depicting the face of a known person that it is desired to identify in the input image by,
extracting the portion of the model image depicting said face,
normalizing the extracted portion of the model image by resizing it to a prescribed scale if not already at the prescribed scale and adjusting the region so that the eye locations of the depicted subject fall within a prescribed area, and
cropping the extracted portion of the model image by eliminating unneeded portions of the image not specifically depicting part of the face of the subject to create a model face image,
categorizing the model face images by assigning each to one of a set of pose ranges into which its associated face pose falls, and
for each pose range,
choosing a prescribed number of the model face images of each person being modeled which have been assigned to the selected pose range,
concatenating each of the chosen model face images to create a respective dimensional column vector (DCV) for each,
computing a covariance matrix from the DCVs,
calculating eigenvectors and corresponding eigenvalues from the covariance matrix,
ranking the eigenvalues in descending order,
identifying a prescribed number of the top eigenvalues,
using the eigenvectors corresponding to the identified eigenvalues to form the rows of a basis vector matrix (BVM) for the pose range, and
multiplying each DCV by each BVM to Produce a set of principal components analysis (PCA) coefficient vectors for each model face image, and
for each face recognition neural network, inputting, one at a time, each of the PCA coefficient vectors associated with the pose range of the face recognition neural network into the inputs of the network until the outputs of the network stabilize,
initializing the fusing neural network for training,
for each DCV, simultaneously inputting the PCA coefficient vectors generated from the DCV into the respective face recognition neural network associated the vector's particular pose range group until all the PCA coefficient vectors of every DCV have been input, and repeating until the outputs of the fusing neural network stabilize, and
for each DCV, simultaneously inputting the PCA coefficient vectors generated from the DCV into the respective face recognition neural network associated the vector's particular pose range group and assigning the active output of the fusing neural network as corresponding to the particular person and pose associated with the model image used to create the set of PCA coefficient vectors; and identifying means for employing the network ensemble to identify the person associated with the characterized input image region and the face pose of that person.

2. The process of claim 1, wherein the identifying means comprises:

preparing means for preparing the face region extracted from an input image by normalizing and cropping the extracted regions, wherein said normalizing comprises resizing the extracted face region to the same prescribed scale if not already at the prescribed scale and adjusting the region so that the eye locations of the depicted subject fall within a prescribed area, and wherein the cropping comprises eliminated unneeded portions of the image not specifically depicting part of the face of the subject;

concatenating means for concatenating the prepared face region to create a DCV;

multiplying means for multiplying the DCV by each BVM to produce a set of PCA coefficient vectors for the extracted face region;

inputting means for inputting each PCA coefficient vector in the set of PCA coefficient vectors into the respective face recognition neural network associated that vector's particular pose range group; and identifying means for identifying the active unit of the output of the fusing neural network and designating the person and pose previously assigned to that unit as the person and pose associated with the extracted face region.

3. A computer-implemented face recognition process for identifying a person depicted in an input image:

creating means for creating a database of a plurality of model image characterizations, each of which represents the face of a known person that it is desired to identify in the input image as well as the person's face pose;

training means for training a neural network ensemble to identify a person and their face pose from a region which has been extracted from said input image and characterized in a manner similar to the plurality of model images, wherein the network ensemble comprises, a first stage having a plurality of classifiers each of which has input and output units and is dedicated to a particular pose range and outputs a measure of the similarity indicative of the similarity between said characterized input image region and each of said model image characterizations associated with the particular pose range of the classifier, and a fusing neural network as its second stage which combines the outputs of the classifiers to generate an output indicative of the person associated with the characterized input image region and the face pose of that person, and wherein training the network ensemble comprises, deriving each model image characterization from a set of model images of people where each model image of the same person shows that person at a different face pose, said deriving comprising, extracting the portion of each model image depicting a face, normalizing the extracted portion of each model image by resizing it to a prescribed scale if not already at the prescribed scale and adjusting the region so that the eye locations of the depicted subject fall within a prescribed area, cropping the extracted portion of each model image by eliminating unneeded portions of the image not specifically depicting part of the face of the subject to create a model face image, concatenating each of the model face images to create a respective model dimensional column vector (DCV) for each, categorizing the model DCVs by assigning each to one of a set of pose ranges into which its associated face pose falls, and inputting the model DCV of the each model face image falling in a particular pose range, one at a time, to a pre-selected classifier dedicated to the particular pose range, initializing the fusing neural network for training, simultaneously inputting the respective DCV of each model face image into all classifiers, until the DCV of every model image has been input, and repeating until the outputs of the neural network stabilize, and simultaneously inputting the respective DCV of each model face image into all classifiers, and assigning the active output the neural network as corresponding to the particular person and pose associated with the model image used to create the DCV; and identifying means for employing the network ensemble to identify the person associated with the characterized input image region and the face pose of that person.

4. The process of claim 3, wherein the identifying means comprises:

preparing means for preparing the face region extracted from an input image by normalizing and cropping the extracted regions, wherein said normalizing comprises resizing the extracted face region to the same prescribed scale if not already at the prescribed scale and adjusting the region so that the eye locations of the depicted subject fall within a prescribed area, and wherein the cropping comprises eliminated unneeded portions of the image not specifically depicting part of the face of the subject;

concatenating means for concatenating the prepared face region to create a DCV;

inputting means for inputting the DCV of the face region into all classifiers; and identifying means for identifying the active output of the neural network and designating the person previously assigned to that unit as the person associated with the extracted face region.

5. The process of claim 4, further comprising specifying means for specifying that the person designated as associated with the extracted face region has the face pose previously assigned to the identified active output.

* * * * *